United States Patent
Marsden et al.

(10) Patent No.: US 11,162,782 B2
(45) Date of Patent: Nov. 2, 2021

(54) METHODS AND APPARATUS FOR OFDR INTERROGATOR MONITORING AND OPTIMIZATION

(71) Applicant: Intuitive Surgical Operations, Inc., Sunnyvale, CA (US)

(72) Inventors: Kevin M. Marsden, Blacksburg, VA (US); Mark E. Froggatt, Blacksburg, VA (US); Matthew S. Wolfe, Blacksburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 0 days.

(21) Appl. No.: 16/941,282

(22) Filed: Jul. 28, 2020

(65) Prior Publication Data

US 2020/0355492 A1    Nov. 12, 2020

Related U.S. Application Data

(63) Continuation of application No. 16/314,307, filed as application No. PCT/US2017/038251 on Jun. 20, 2017, now Pat. No. 10,782,121.

(60) Provisional application No. 62/355,957, filed on Jun. 29, 2016.

(51) Int. Cl.
*G01B 11/16* (2006.01)
*G01D 5/353* (2006.01)

(52) U.S. Cl.
CPC ......... *G01B 11/161* (2013.01); *G01D 5/3538* (2013.01); *G01D 5/35306* (2013.01)

(58) Field of Classification Search
CPC .. G01B 11/161; G01B 11/16; G01D 5/35306; G01D 5/3538; G01D 5/35393; G01D 5/353

USPC ................................................ 356/73.1, 35.5
See application file for complete search history.

(56) References Cited

U.S. PATENT DOCUMENTS

| | | | |
|---|---|---|---|
| 6,144,326 A | 11/2000 | Krone et al. | |
| 6,900,897 B2* | 5/2005 | Froggatt | G01J 9/0246 356/477 |
| 7,250,892 B2 | 7/2007 | Weinstein et al. | |

(Continued)

FOREIGN PATENT DOCUMENTS

| CN | 101557071 A | 10/2009 |
|---|---|---|
| CN | 101752776 A | 6/2010 |

(Continued)

OTHER PUBLICATIONS

Cao, J., et al., "Fiber Laser Synthesis Technology", Infrared and Laser Engineering, 2008, vol. 37 (3), pp. 456-460.

(Continued)

*Primary Examiner* — Roy M Punnoose
(74) *Attorney, Agent, or Firm* — Schwegman Lundberg & Woessner, P.A.

(57) ABSTRACT

Example embodiments add an optical amplifier to an multi-channel, continuously swept OFDR measurement system, adjust amplified swept laser output power between rising and falling laser sweeps, and/or utilize portions of a laser sweep in which OFDR measurements are not typically performed to enhance the integrity of the OFDR measurement system, improve the performance and quality of OFDR measurements, and perform additional measurements and tests.

20 Claims, 18 Drawing Sheets

(56) References Cited

U.S. PATENT DOCUMENTS

| | | | |
|---|---|---|---|
| 7,440,087 B2 * | 10/2008 | Froggatt | G01M 11/3172 356/73.1 |
| 7,515,076 B1 | 4/2009 | Singh et al. | |
| 8,400,620 B2 * | 3/2013 | Froggatt | G01B 11/161 356/35.5 |
| 8,531,655 B2 * | 9/2013 | Klein | G01L 1/242 356/73.1 |
| 8,567,246 B2 | 10/2013 | Shaeffer et al. | |
| 8,582,109 B1 | 11/2013 | Schmitt | |
| 8,773,650 B2 | 7/2014 | Froggatt et al. | |
| 9,025,158 B2 * | 5/2015 | Froggatt | G01B 9/02004 356/478 |
| 9,178,611 B2 | 11/2015 | Reaves et al. | |
| 9,784,569 B2 * | 10/2017 | Froggatt | G01B 11/16 |
| 10,782,121 B2 | 9/2020 | Marsden et al. | |
| 2002/0025097 A1 * | 2/2002 | Cooper | G01D 5/35383 385/12 |
| 2006/0071729 A1 | 4/2006 | Cetin et al. | |
| 2006/0140529 A1 * | 6/2006 | Childers | G02B 6/0208 385/4 |
| 2010/0141930 A1 | 6/2010 | Omichi et al. | |
| 2011/0317148 A1 * | 12/2011 | Froggatt | G01L 1/242 356/35.5 |
| 2012/0236510 A1 | 9/2012 | Wong | |
| 2013/0308136 A1 | 11/2013 | Kuznetsov et al. | |
| 2014/0070859 A1 | 3/2014 | Waltari et al. | |
| 2015/0109157 A1 | 4/2015 | Caldwell et al. | |
| 2015/0138563 A1 * | 5/2015 | Wang | G01B 9/02011 356/479 |
| 2015/0200649 A1 | 7/2015 | Trager et al. | |
| 2015/0245135 A1 | 8/2015 | Gao et al. | |
| 2015/0346053 A1 | 12/2015 | Lally et al. | |
| 2016/0123715 A1 | 5/2016 | Froggatt et al. | |
| 2016/0146699 A1 | 5/2016 | Lally et al. | |
| 2017/0168180 A1 | 6/2017 | Senechal | |
| 2017/0328712 A1 | 11/2017 | Collin et al. | |
| 2017/0363410 A1 | 12/2017 | Froggatt et al. | |
| 2019/0234726 A1 | 8/2019 | Gifford et al. | |
| 2020/0096322 A1 | 3/2020 | Marsden et al. | |

FOREIGN PATENT DOCUMENTS

| | | |
|---|---|---|
| CN | 102035129 A | 4/2011 |
| CN | 102695938 A | 9/2012 |
| CN | 103763022 A | 4/2014 |
| CN | 104330939 A | 2/2015 |
| CN | 104880159 A | 9/2015 |
| CN | 105067103 A | 11/2015 |
| JP | 2010034173 A | 2/2010 |
| JP | 2013130467 A | 7/2013 |
| KR | 101510584 B1 | 4/2015 |
| WO | WO-2011034584 A2 | 3/2011 |
| WO | WO-2011104319 A1 | 9/2011 |
| WO | WO-2013085833 A1 | 6/2013 |
| WO | WO-2014113333 A1 | 7/2014 |
| WO | WO-2015165924 A1 | 11/2015 |

OTHER PUBLICATIONS

Extended European Search Report for Application No. EP17820930.0 dated Feb. 4, 2020, 9 pages.

International Search Report and Written Opinion for Application No. PCT/US2017/038251, dated Oct. 27, 2017, 24 pages.

Kersey A.D, and Dandridge A., "Distributed and Multiplexed Fiber Optic Sensors," Journal of the Institution of Electronic and Radio Engineers, Jul./Aug. 1988, vol. 58 (5), pp. S99-S111.

Office Action dated Jun. 3, 2020 for Chinese Application No. 20178023936 filed Jun. 20, 2017, 56 pages.

Sharma P., et al., "Study of Single and Multi Wavelength(WDM) EDFA Gain Control Methods," International Journal of Engineering Trends and Technology (IJETT), vol. 4(5), May 2013, pp. 1424-1427.

Tünnermann H., et al., "Gain Dynamics and Refractive Index Changes in Fiber Amplifiers: A FrequencyDomain Approach," Optics Express, vol. 20 (12), Jun. 4, 2012, pp. 13539-13550.

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

Extended European Search Report for Application No. 21156934.8, dated Jun. 2, 2021, 7 pages.

\* cited by examiner

METHODS AND APPARATUS FOR OFDR INTERROGATOR MONITORING AND OPTIMIZATION

CLAIM OF PRIORITY

This application is a continuation of and claims the benefit of priority under 35 U.S.C. § 120 to U.S. patent application Ser. No. 16/314,307, filed on Dec. 28, 2018, which is a U.S. National Stage Filing under 35 U.S.C. 371 from International Application No. PCT/US2017/038251, filed on Jun. 20, 2017, and published as WO 2018/005161 A1 on Jan. 4, 2018, which claims the priority and benefit of U.S. Provisional Patent Application 62/355,957, filed Jun. 29, 2016, entitled "METHODS AND APPARATUS FOR OFDR INTERROGATOR MONITORING AND OPTIMIZATION," each of which is incorporated herein by reference in its entirety.

TECHNICAL FIELD

The technology described in this application relates to Optical Frequency Domain Reflectometry (OFDR) measurements used for fiber optic shape sensing and to data processing technology to improve the accuracy and reliability of those OFDR measurements.

INTRODUCTION

Optical strain sensing is a technology useful for measuring physical deformation of a waveguide caused by, for example, the change in tension, compression, or temperature of an optical fiber. A multi-core optical fiber is composed of several independent waveguides embedded within a single fiber. A continuous measure of strain along the length of a core can be derived by interpreting the optical response of the core using swept wavelength inteferometery typically in the form of Optical Frequency Domain Reflectometry (OFDR) measurements. With knowledge of the relative positions of the cores along the length of the fiber, these independent strain signals may be combined to gain a measure of the strain profile applied to the multi-core optical fiber. The strain profile of the fiber refers to the measure of applied bend strain, twist strain, and/or axial strain along the length of the fiber at a high (e.g., less than 50 micrometers) sample resolution.

Previous patents have described OFDR-based shape sensing with multi-core optical fibers (e.g., see U.S. Pat. Nos. 7,781,724 and 8,773,650 incorporated by reference). Some applications for OFDR-based shape sensing fiber require a high degree of confidence in terms of the accuracy and reliability of the shape sensing output. A non-limiting example application is robotic arms used in surgical or other environments.

In OFDR measurement systems, there are three basic elements: light, a medium (e.g., a fiber waveguide) in which the light traverses, and a receiver that detects light and converts it to an electric signal. Each of these basic elements contributes to the accuracy of the measurement being performed. An example fiber optic shape sensing system is shown in FIG. 1 and includes a tunable laser 1 swept to provide light at different frequencies or wavelengths to an optical network 2 coupled to an optical fiber sensor/device under test (DUT) 3 (also referred to herein as "sensor 3" or "DUT 3"). Each scan by the tunable laser over a tuning range of wavelengths or frequencies produces a set of OFDR measurement data. The optical network 2 is coupled to detection, acquisition, and control electronics 4 that includes detectors to convert optical information into electrical signals, analog to digital converters to convert analog electrical signals to digital electrical signals, and a field programmable gate array (FPGA) to process acquired data and control acquisition. The detection, acquisition, and control electronics 4 provide outputs to a processor 5 for further processing, such as computing the shape of the fiber, and ultimately output of information from the fiber sensor/DUT 3. The processor 5 may also or alternatively include an FPGA or GPU.

In the example fiber optic shape sensing system shown in FIG. 1, shape measurements depend on several factors including the ability to accurately detect the light reflected from the medium which is a multicore optical fiber sensor. OFDR-based fiber optic shape sensing detects point-to-point length changes in each core of the fiber sensor, and the accuracy and noise of the OFDR measurement system rely on repeatable transmission of light into the fiber sensor and repeatable detection of the reflected light from measurement to measurement. The detection of the reflected light at varying frequencies (in OFDR the laser is swept or scanned through a measurement range of wavelengths or frequencies) in the optical frequency domain and the time domain are important to achieving accurate fiber optic shape measurements. OFDR scan-to-scan differences or inter-scan differences that are not the result of physical changes in the sensing fiber can introduce error in the OFDR measurement data if they are not reduced or corrected. Example sources of error include laser tuning speed variations, optical output power fluctuations, interferometer path length changes, core-to-core delay shifts, and electrical signal delays in the OFDR channels.

Assuming that relative delays of the detection circuit between the cores are constant, phase changes between cores can be interpreted as resulting from a physical change made to the sensing fiber. But the inventors discovered that these delay relationships change over time, vary with temperature, and/or are affected by an interrogation device failure. Delay shifts introduced in data acquisition and processing introduce error into the OFDR measurement, which is wrongly interpreted as a physical change to the sensing fiber shape. In addition, laser scan-to-laser scan optical power level changes can also lead to OFDR measurement error. Such optical power level changes can result in mismatched signal-to-noise ratio (SNR) between rising and falling sweeps of the laser and/or varying SNR over the optical frequency range in which the OFDR measurement is performed.

SUMMARY

Example embodiments include an optical measurement system that measures an optical fiber sensor that includes multiple optical cores. A tunable laser sweeps over a first measurement range of wavelengths, and an optical amplifier amplifies the swept laser light. An optical network provides the amplified swept laser light to the optical fiber sensor and output reflected light from the optical fiber sensor associated with each of the multiple cores. Detection circuitry detects and converts the output reflected light from the optical fiber sensor into corresponding electrical signals. Data processing circuitry controls a gain of the optical amplifier to control the power of the swept laser light.

The optical amplifier may be implemented for example with an Erbium-Doped Fiber Amplifier (EDFA) connected to an output of a pump laser source and a portion of laser light from an optical splitter coupled to the tunable laser.

An example optical measurement system is an Optical Frequency Domain Reflectometry (OFDR) interrogation system. The optical network includes a laser monitor interferometer coupled to the detection circuitry and a measurement interferometer coupled to the optical fiber sensor and the detection circuitry. The tunable laser continuously sweeps over the first measurement range of wavelengths so that the detection circuitry acquires OFDR measurement data from the optical fiber sensor during rising and falling sweeps of the tunable laser.

In example implementations, the data processing circuitry controls a gain of the optical amplifier to compensate for laser power imbalances or fluctuation during the rising and falling sweeps of the tunable laser; corrects the gain of the optical amplifier at multiple different frequencies in the first measurement range of frequencies; controls a gain of the optical amplifier to maintain a substantially constant laser power level over the first measurement range of frequencies; and controls a gain of the optical amplifier to a first gain for the rising sweep of the tunable laser and a second different gain for the falling sweep of the tunable laser.

Other example embodiments include an Optical Frequency Domain Reflectometry (OFDR) interrogation system for measuring an optical fiber sensor including multiple optical cores. The tunable laser sweeps over a first measurement range of wavelengths generating a swept laser output signal. A modulator adds a known signal to the swept laser output. An optical interferometric network provides the amplified swept laser light to the optical fiber sensor and output reflected light from the optical fiber sensor associated with each of the multiple cores corresponding to sensor measurement data. Detection circuitry detects and converts the output reflected light from the optical fiber sensor into corresponding electrical signals. Data processing circuitry processes the sensor measurement data acquired during sweeps of the tunable laser in the first measurement range of wavelengths based on the added known signal.

The data processing circuitry may be configured to determine, based on the added known signal, errors from delays caused by one or more of the optical interferometric network, the optical fiber sensor, or the detection circuitry.

Example implementation features include a laser driver, where the modulator is coupled to the output of the laser driver. The modulator may include a controller coupled to a digital to analog converter which drives a voltage-controlled oscillator and a filter to filter an output from the voltage-controlled oscillator to generate the known signal. Another example modulator includes a numerically-controlled oscillator to generate a binary signal having a most significant bit used to provide a clock signal and a filter to filter the clock signal to generate the known signal. The fiber may have N optical cores, N being a positive integer greater than 3, and the modulator includes a numerically-controlled oscillator to generate N phase signals corresponding to the N optical cores and N−1 phase difference signals. A phase error in the sensor measurement data may be based on the N−1 phase difference signals.

The tunable laser sweep may include a rising sweep where the wavelength increases from smallest to largest wavelength in the first measurement range of wavelengths and a falling sweep where the wavelength decreases from largest to the smallest wavelength in the first measurement range of wavelengths. The laser sweep includes a turnaround portion transitioning between the rising and falling sweeps. The modulator may be controlled to add the known signal to the swept laser output during the turnaround portion. Alternatively, the modulator may be controlled to add the known signal to the swept laser output at wavelengths outside the first measurement range of wavelengths.

Still further example embodiments include an OFDR interrogation system having a tunable laser that sweeps over a first measurement range of wavelengths including a rising sweep of the tunable laser where the wavelength increases from smallest to largest wavelength in the first measurement range of wavelengths and a falling sweep of the tunable laser where the wavelength decreases from largest to the smallest wavelength in the first measurement range of wavelengths. The laser sweep includes a turnaround portion transitioning between the rising and falling sweeps. An optical interferometric network provides the amplified swept laser light to the optical fiber sensor and outputs reflected light from the optical fiber sensor associated with each of the multiple cores corresponding to sensor measurement data. Detection circuitry detects and converts the output reflected light from the optical fiber sensor into corresponding electrical signals. Data processing circuitry processes the sensor measurement data acquired during the rising and falling sweeps of the tunable laser in the first measurement range of wavelengths and performs an additional operation during the turnaround portion of the laser sweep.

For example, the additional operation may be performing additional measurements at swept laser wavelengths other than those in the predetermined range. In this situation, a sweep rate of the laser for some of the other swept laser wavelengths may be slower than a sweep rate of the laser for the sweeps of the tunable laser in the first measurement range of wavelengths.

Other example additional operations include balancing a power level of the swept laser light in the rising and falling sweeps, making scatter-based OFDR measurements for the optical fiber sensor, and performing in-system checks or adjustments in response to system dynamics.

If the optical fiber sensor includes fiber Bragg gratings that provide light reflections within the first measurement range of wavelengths, another example additional operation includes making scatter-based OFDR measurements separated in wavelength from the grating reflections.

DETAILED DESCRIPTION

Figure 1:
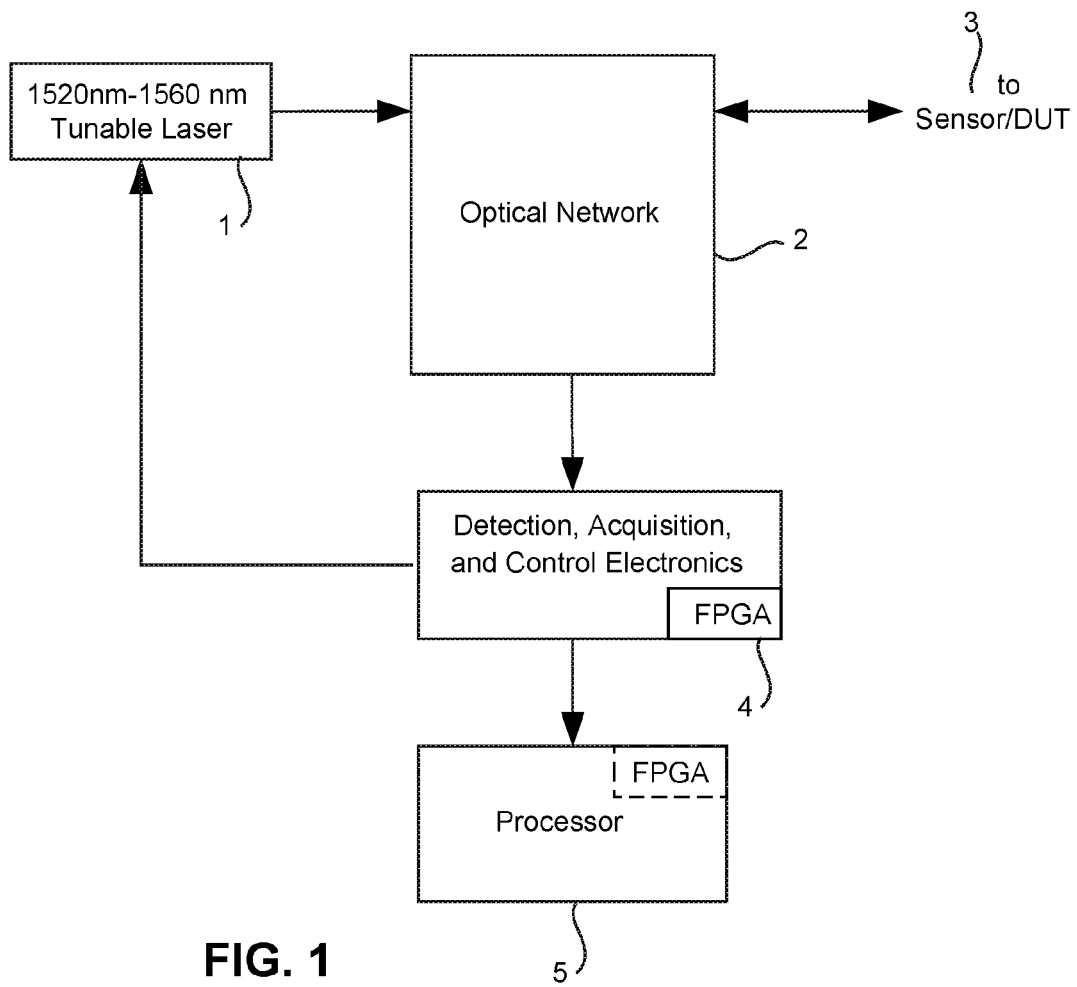
FIG. 1 shows an example OFDR measurement system.

The following description sets forth specific details, such as particular embodiments for purposes of explanation and not limitation. But it will be appreciated by one skilled in the art that other embodiments may be employed apart from these specific details. In some instances, detailed descriptions of well-known methods, interfaces, circuits, and devices are omitted so as not to obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer-readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus, machine-implemented.

In terms of hardware implementation, the functional blocks may include or encompass, without limitation, a digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The technology described in this application determines and reduces or eliminates sources of error affecting fiber optic measurements.

Increased Gain and Gain Balancing in an OFDR System

As described in the introduction, FIG. 1 is an example OFDR measurement system. Unamplified light swept over a range of frequencies/wavelength by a single tunable laser 1 is guided to an optical network 2, and reflected light from the sensor or DUT 3 interferes with light traversing a reference path of the optical network 2. The resulting light is detected and converted to digital form by detection and acquisition electronics 4 and processed in the processor 5 to provide a desired OFDR measurement, e.g., a shape of the fiber sensor 3. In some instances, the OFDR measurement is performed in one laser sweep direction, either increasing or decreasing in optical frequency. Depending on the application requirements such as the update rate, sweep rate and sweep range, it is not always suitable to only perform the desired measurement in a single sweep direction of the laser. Many applications require a laser that is continuously swept with rising/increasing and falling/decreasing sweeping.

Figure 2:
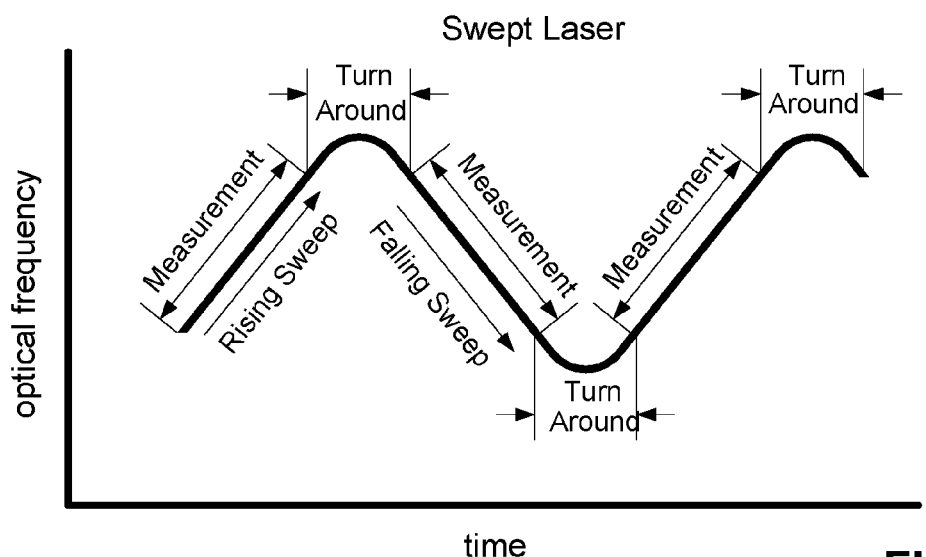
FIG. 2 is a graph showing turn around points in a laser sweep or scan.

An example of a continuous laser sweep is illustrated in FIG. 2 which depicts the laser's optical frequencies as a function of time. The slope of this plot represents the laser's sweep rate. For a Rising Sweep, the laser is tuned from a lower optical frequency to a higher optical frequency. For a Falling Sweep, the laser is tuned from a higher optical frequency to a lower optical frequency. In addition to these Rising and Falling Sweeps there are additional parts of the sweep referred to in this application as laser turnarounds, which include parts of the laser sweep from the completion of one measurement to the start of the next measurement. The turnarounds include a continuation of the current sweep before a laser's sweep rate is slowed, eventually changing the sweep direction, and then accelerating in the opposite direction until the desired sweep rate is reached.

When the fiber sensor 3 is under tension or compression, the fiber cores experience some amount of lengthening or shortening. Bend, twist, and overall tension cause changes in the strain measured in the various fiber cores. A matrix can be formed to describe the relationship between the bend, twist, and strain on the fiber sensor and the strain on each core. For example, if four cores in the fiber sensor are used to measure shape, the relationship between the strain in these four cores and the applied bend, twist, and strain as a function of length is:

$$\begin{bmatrix} \varepsilon_1(z) \\ \varepsilon_2(z) \\ \varepsilon_3(z) \\ \varepsilon_4(z) \end{bmatrix} = \begin{bmatrix} \alpha r_1 \sin(\theta_1) & -\alpha r_1 \cos(\theta_1) & \beta r_1^2 & 1 \\ \alpha r_2 \sin(\theta_2) & -\alpha r_2 \cos(\theta_2) & \beta r_2^2 & 1 \\ \alpha r_3 \sin(\theta_3) & -\alpha r_3 \cos(\theta_3) & \beta r_3^2 & 1 \\ \alpha r_4 \sin(\theta_4) & -\alpha r_4 \cos(\theta_4) & \beta r_4^2 & 1 \end{bmatrix} \begin{bmatrix} B_x(z) \\ B_y(z) \\ T(z) \\ E(z) \end{bmatrix} \quad (1)$$

Here $\varepsilon_i(z)$ is the strain measured in core i as a function of distance down the sensor, z, $\alpha$ is a constant relating strain to bend ("bend gain"), $\beta$ is a constant relating strain to twist ("twist gain"), $r_i$ is the radial location of core i with respect to the center of the fiber, $\theta_i$ is the angular location of core i relative to a reference core, $B_x(z)$ is the bend in the X-Z plane as a function of distance down the sensor, $B_y(z)$ is the bend in the Y-Z plane as a function of distance, $T(z)$ is the twist of the sensor as a function of distance, and $E(z)$ is the axial strain applied to the sensor as a function of distance.

A measurement of the amplitude and phase of the light reflected along the length of the fiber sensor with high resolution and high sensitivity may be achieved using Optical Frequency Domain Reflectometry (OFDR).

In the case of a multiple channel OFDR interrogation system, each channel corresponds to a core in a multi-core fiber sensor or DUT. In a multiple channel OFDR interrogation system, it can be advantageous to add an amplifier to increase the power to each channel. Example embodiments add an erbium-doped fiber amplifier (EDFA) into an OFDR system to increase the power of the laser light coupled to the fiber sensor. But the EDFA introduces a new variable into the OFDR measurement system: amplifier gain. When a pump laser in an EDFA is driven by a constant current source, the gain of the EDFA can vary depending on various factors including the direction in which the swept laser is tuned, the instantaneous wavelength of the light being amplified, and the sweep speed or rate of the laser.

Figure 3:
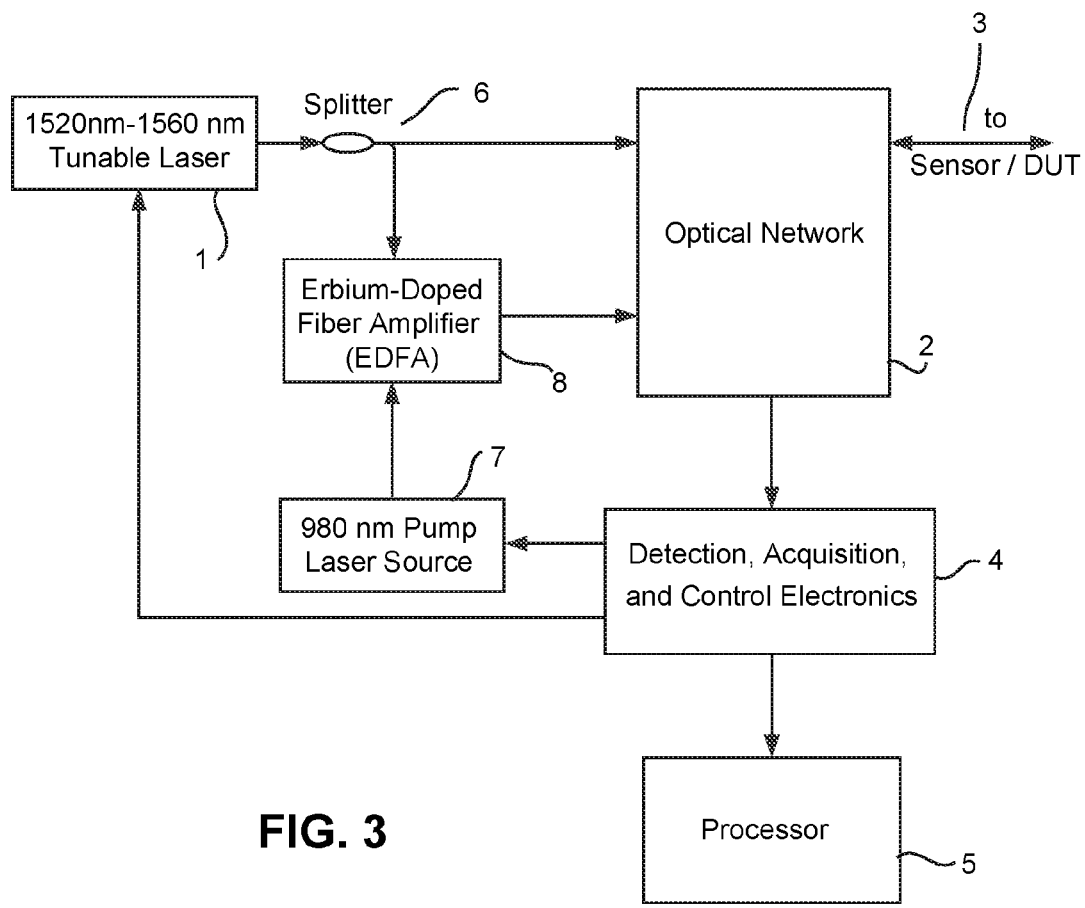
FIG. 3 shows an example OFDR measurement system in accordance with example embodiments.

An example embodiment of an added EDFA is shown in FIG. 3. The tunable laser 1, controlled by the detection, acquisition, and control electronics 4, is shown with an example wavelength sweep range of 1520 nm-1560 nm. A pump laser 7, controlled by the detection, acquisition, and control electronics 4, provides light at a particular wavelength, e.g., 980 nm, to an erbium-doped fiber amplifier (EDFA) 8. An optical splitter 6 splits the light from the tunable laser 1 into two paths: one to the EDFA 8 and one to the reference path of the Optical Network 2. The amplified light from the EDFA 8 is split into each OFDR measurement channel and guided to each core of a multi-core sensor fiber comprising fiber sensor 3.

Figure 4:
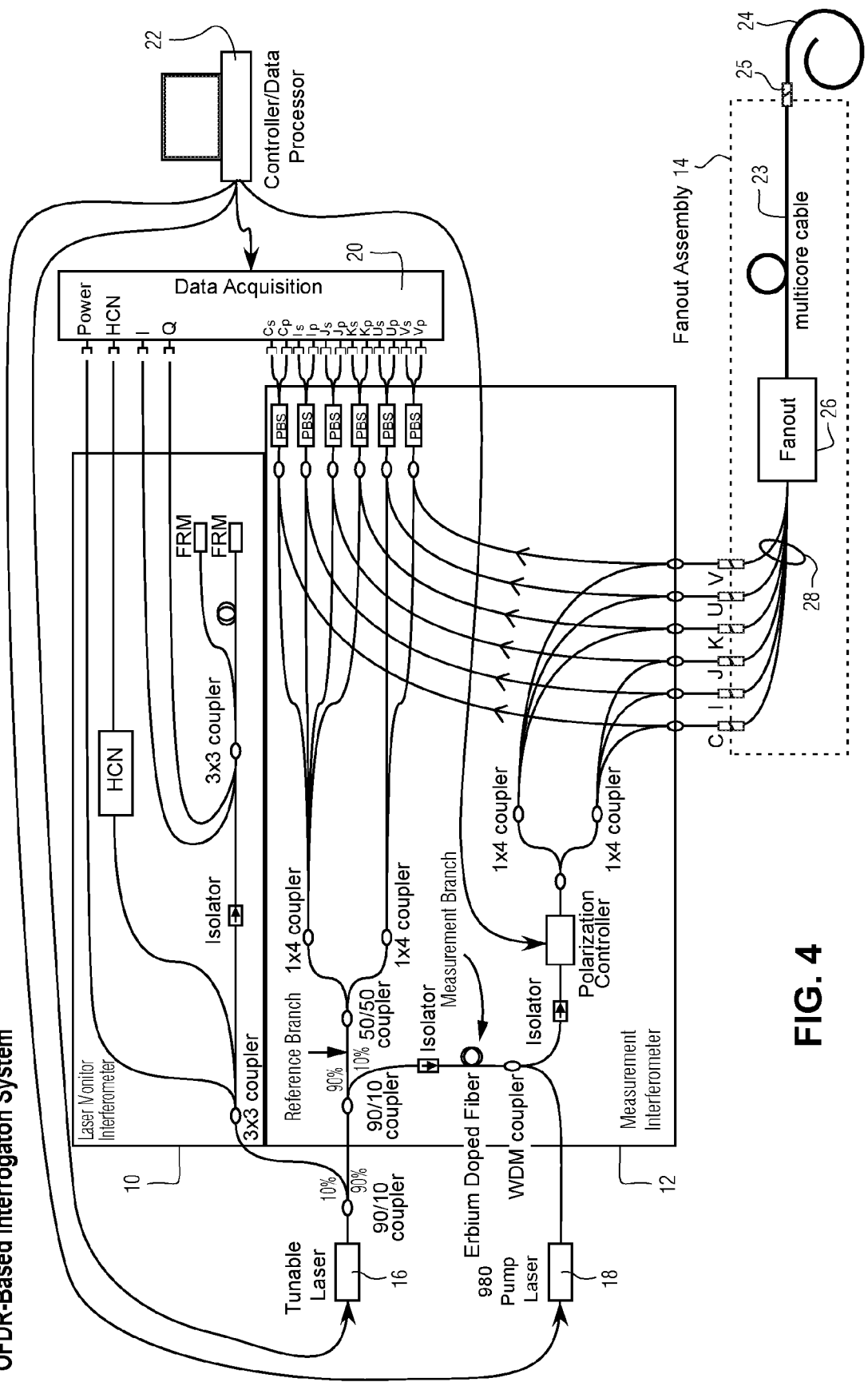
FIG. 4 shows a more detailed example OFDR measurement system in accordance with example embodiments.

FIG. 4 shows a detailed example embodiment of an EDFA added to an OFDR-based interrogation system for an example 6-core fiber sensor. Light from a frequency tunable laser 16, controlled in this example by the processor 22 rather than by the data acquisition electronics 20, is split with 90/10 coupler between a laser monitor interferometer 10 and a measurement interferometer 12. In the laser monitor interferometer 10, the light is spilt into three paths using a 3×3 coupler. The first path goes to a detector to monitor laser power. The second path passes through a hydrogen cyanide (HCN) gas cell to a detector to provide an absolute wavelength reference. The final path goes through an isolator and another 3×3 coupler to two Faraday rotator mirrors (FRM) with one leg having a known delay difference from the other. The return signals from this interferometer form I/Q signals. With a phase offset of 120 degrees, the I/Q signals are converted to quadrature signals and used to measure the change in optical frequency as the laser sweeps.

The light going into the measurement interferometer 12 is split using a 90/10 coupler between a reference branch and measurement branch of the interferometer 12. The light in the reference branch is split into six reference signals using cascaded couplers. The light in the measurement branch passes through an isolator and then through a length of erbium-doped fiber. This fiber is pumped with light from a 980 nm pump laser 18, controlled in this example by the processor 22 rather than by the data acquisition electronics 20, that couples in through a Wavelength Division Multiplexed (WDM) coupler. This combination of erbium-doped fiber and pump laser 18 amplifies the light in the measurement branch of the interferometer. The light passes through another isolator and then through a polarization controller set to flip the light between two orthogonal (or nearly orthogonal) polarization states on subsequent scans. The light is then split with cascading couplers into six measurement channels. The returning light is combined with the six reference paths using 2×2 couplers. These combined signals then pass through polarization beam splitters (PBSs) to two detectors (S and P) for each channel (C, I, J, K, U, V) input to the data acquisition circuitry 20, forming a polarization diverse detection scheme. This creates an interferometric measurement of the light reflected from up to six cores of a multicore fiber. The six channels (C, I, J, K, U, V) are connected to each core of a multicore fiber sensor 24 using a fanout assembly 14 that couples six single core fibers 28 to six cores in a multicore cable 23 connected by a connector 25 to the multicore fiber sensor 24. The controller/data processor 22 controls the tunable laser 16, the polarization controller, and the polarization beam splitters, and also drives the pump laser 18. The data processor 22 also acquires and processes the data from each of the photodiode detectors provided from the data acquisition circuitry 20.

The recorded data is the reflected amplitude as a function of optical frequency for two polarization states, S and P, for each fiber optic core measured. The controller/data processor 22 linearizes this recorded data with respect to optical frequency using the data from the laser monitor interferometer 10 so that it is represented in equal increments of optical frequency. The linearized data is Fourier transformed into the time domain to represent the amplitude and phase of the reflected light as a function of optical delay along each fiber core. The S and P data from two sequential orthogonal polarization scans are combined to compensate for birefringence in the fiber cores and form a scalar measure of the amplitude and phase of the reflected light from each core. This combined complex signal (amplitude and phase) is compared with interferometric data recorded in a reference scan, and the resulting phase difference/change for each core is the measured signal that is used to compute the current shape of the fiber.

The derivatives of the measured phase changes are proportional to the strains in each core. The proportionality constant, $\gamma_i$, relating the phase to strain in core i is the strain-optic coefficient for that core. Equation 1 can then be expressed as:

$$\begin{bmatrix} \varphi'_1(z) \\ \varphi'_2(z) \\ \varphi'_3(z) \\ \varphi'_4(z) \end{bmatrix} = \begin{bmatrix} \alpha\gamma_1 r_1 \sin(\theta_1) & -\alpha\gamma_1 r_1 \cos(\theta_1) & \beta\gamma_1 r_1^2 & \gamma_1 \\ \alpha\gamma_2 r_2 \sin(\theta_2) & -\alpha\gamma_2 r_2 \cos(\theta_2) & \beta\gamma_2 r_2^2 & \gamma_2 \\ \alpha\gamma_3 r_3 \sin(\theta_3) & -\alpha\gamma_3 r_3 \cos(\theta_3) & \beta\gamma_3 r_3^2 & \gamma_3 \\ \alpha\gamma_4 r_4 \sin(\theta_4) & -\alpha\gamma_4 r_4 \cos(\theta_4) & \beta\gamma_4 r_4^2 & \gamma_4 \end{bmatrix} \begin{bmatrix} B_x(z) \\ B_y(z) \\ T(z) \\ E(z) \end{bmatrix} \quad (2)$$

where $\varphi'_i(z)$ is the derivative of the measured phase change for core i as a function of distance down the fiber sensor 24.

Because the position of the fiber sensor is found by first measuring the phase change in each core and then calculated by integrating the bends, $B_x(z)$ and $B_y(z)$, along the fiber while accounting for the twist, $\tau(z)$, the inverse of this equation is needed:

$$\begin{bmatrix} B_x(z) \\ B_y(z) \\ T(z) \\ E(z) \end{bmatrix} = \begin{bmatrix} \alpha\gamma_1 r_1 \sin(\theta_1) & -\alpha\gamma_1 r_1 \cos(\theta_1) & \beta\gamma_1 r_1^2 & \gamma_1 \\ \alpha\gamma_2 r_2 \sin(\theta_2) & -\alpha\gamma_2 r_2 \cos(\theta_2) & \beta\gamma_2 r_2^2 & \gamma_2 \\ \alpha\gamma_3 r_3 \sin(\theta_3) & -\alpha\gamma_3 r_3 \cos(\theta_3) & \beta\gamma_3 r_3^2 & \gamma_3 \\ \alpha\gamma_4 r_4 \sin(\theta_4) & -\alpha\gamma_4 r_4 \cos(\theta_4) & \beta\gamma_4 r_4^2 & \gamma_4 \end{bmatrix}^{-1} \begin{bmatrix} \varphi'_1(z) \\ \varphi'_2(z) \\ \varphi'_3(z) \\ \varphi'_4(z) \end{bmatrix} = \overline{\overline{S}} \begin{bmatrix} \varphi'_1(z) \\ \varphi'_2(z) \\ \varphi'_3(z) \\ \varphi'_4(z) \end{bmatrix} \quad (3)$$

Here, $\overline{\overline{S}}$ is known as the shape matrix.

Figure 5:
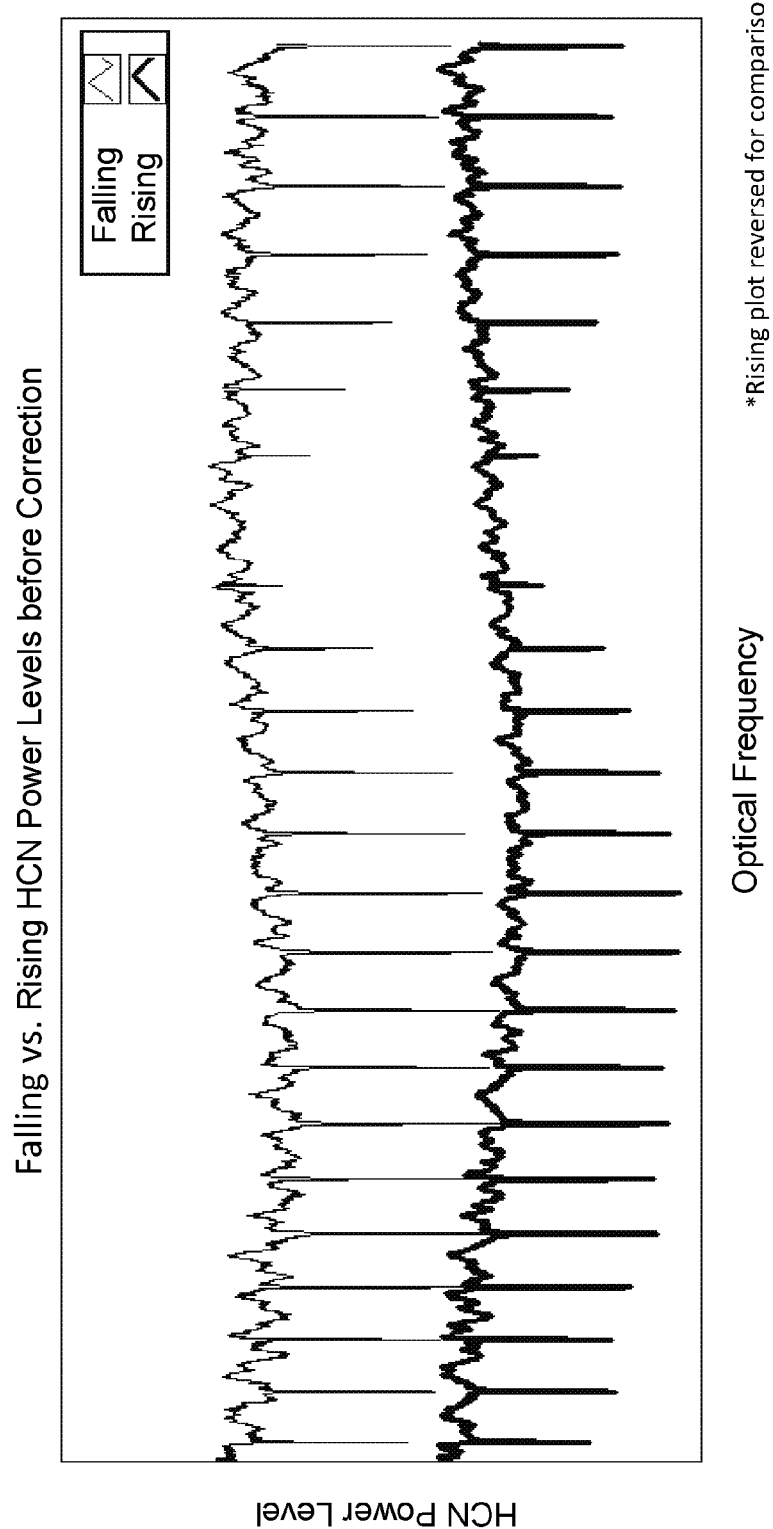
FIG. 5 is a graph showing example falling v. rising hydrogen cyanide (HCN) gas cell power levels in an OFDR system without correction.

The addition of a fiber amplifier in the measurement branch provides the benefit of increased power to the sensor or DUT, but it also introduces an error in the OFDR measurement in the form of power fluctuations between the rising and falling sweeps of the laser. An example of these fluctuations are shown in the graph in FIG. 5, which illustrates the difference in power levels between rising and falling laser sweeps that are due to the differences in amplification between the sweeps performed over 10 nm at 2,937,500 GHz/s. The power level, detected using an HCN Gas Cell connected in place of the sensor or DUT, (this is not shown in FIG. 4), shows a difference of more than 2 dB between rising and falling laser sweep measurements. Note that in FIG. 5 the rising laser sweep data (bold black line) has been reversed for comparison with falling laser sweep data (thin black line); both are displayed from higher to lower optical frequencies.

Changes in the pump laser power result in a gain change of the EDFA with a response time that is a function of the fluorescence lifetime and the signal and pump power in the erbium-doped fiber. When the pump laser power is adjusted, there is a delay before the power at the output of the EDFA changes. This delay along with the gain response of the EDFA as a function of wavelength may affect the EDFA output as the tunable laser is swept. To compensate for how the EDFA's gain varies as a function of wavelength a gain flattening filter (GFF) at the output filter may be added. But there are gain differences even at the same wavelength that vary based on sweep direction. Also, GFFs suffer from temperature-dependent wavelength shifts.

In a continuously swept OFDR system, OFDR measurement data is acquired as the optical frequency of a tunable laser is increased (rising sweep of the laser) and as the optical frequency of the swept laser is decreased (falling sweep of the laser). The light is amplified using an optical amplifier, the gain of which is higher on falling sweeps than it is on rising sweeps. This gain difference can lead to less optimal system performance and less accurate measurement results.

To correct for unbalanced power during a sweep and from sweep to sweep, example embodiments vary the pump laser power between predetermined points to maintain a substantially constant level of output power to the sensor fiber or device under test (DUT) in an OFDR system. In one example embodiment, the amplifier gain is modulated between two states: one for rising sweeps and one for falling sweeps. This embodiment allows the power to be balanced in the two laser sweep directions. Further, the amplifier gain may be modulated within a laser sweep with the addition of gain set points to flatten the power across the optical frequency range in which OFDR measurement data is acquired. Example embodiments also use turnarounds to make adjustments to balance the laser power between rising and falling laser sweeps. One example adjustment includes adjusting the current driving the tunable laser's diode over the entire sweep cycle including rising, falling, and turnaround portions.

In example embodiments, to compensate for the sweep direction dependent gain difference, the data, acquisition, and control electronics 4 adjusts the amplifier's pump laser power to pre-calibrated levels for the rising and falling sweeps. Specifically, the system is configured to include two power states for the pump laser: one for the falling sweep and one for the rising sweep. (The adjustment may alternatively be controlled by processor 5). An example of this pump laser power switching is illustrated in FIGS. 6A and 6B.

Figure 6A:
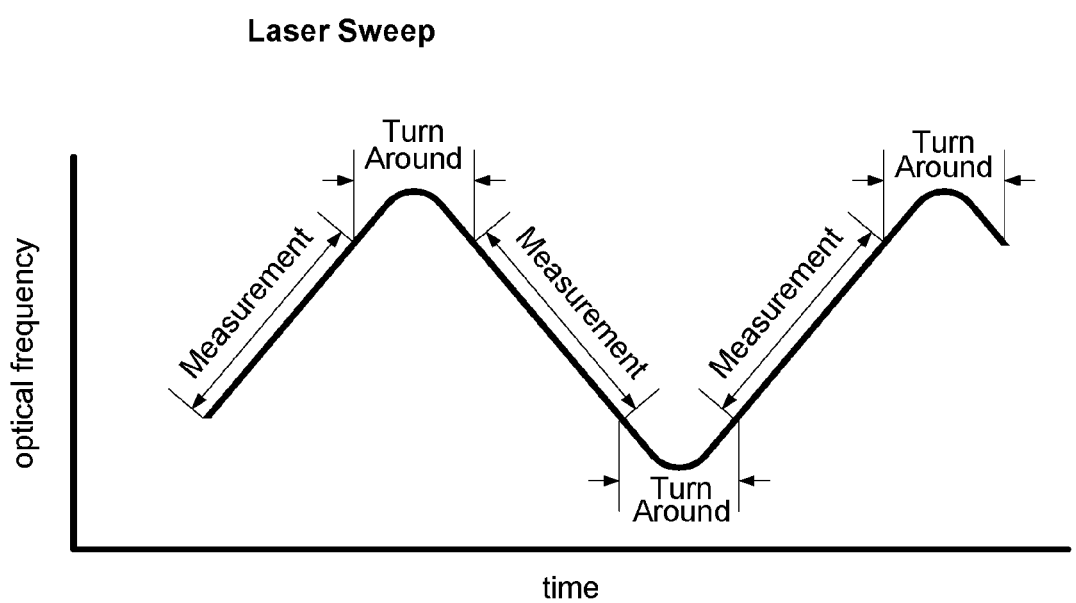
FIGS. 6A and 6B are graphs showing an example laser sweep and pump laser power, respectively.
Figure 6B:
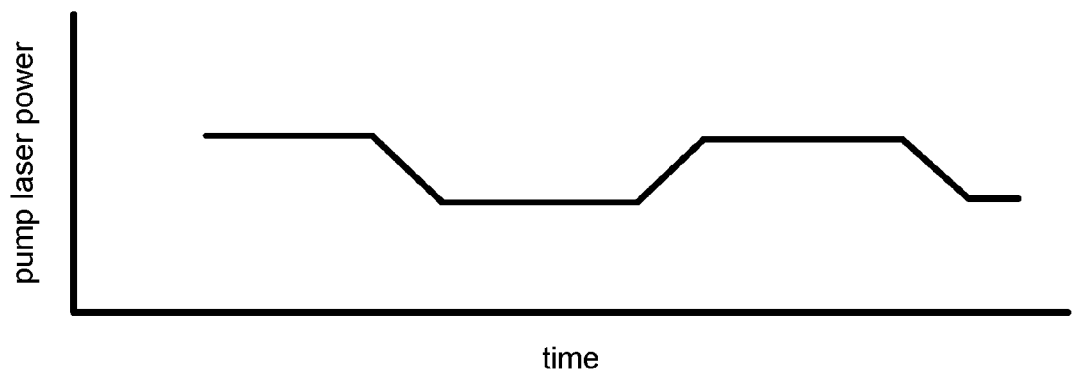

Looking at FIGS. 6A and 6B, the falling sweep power is left as is, and the rising sweep power is increased to match that of the falling sweep. Because there is a response delay of the amplifier's gain, the pump laser is driven to a higher power level following the completion of a falling sweep at the start of the laser turnaround. Setting the pump laser power level at the start of the turnaround provides sufficient time for the amplifier gain to be adjusted to the new level.

Figure 7:
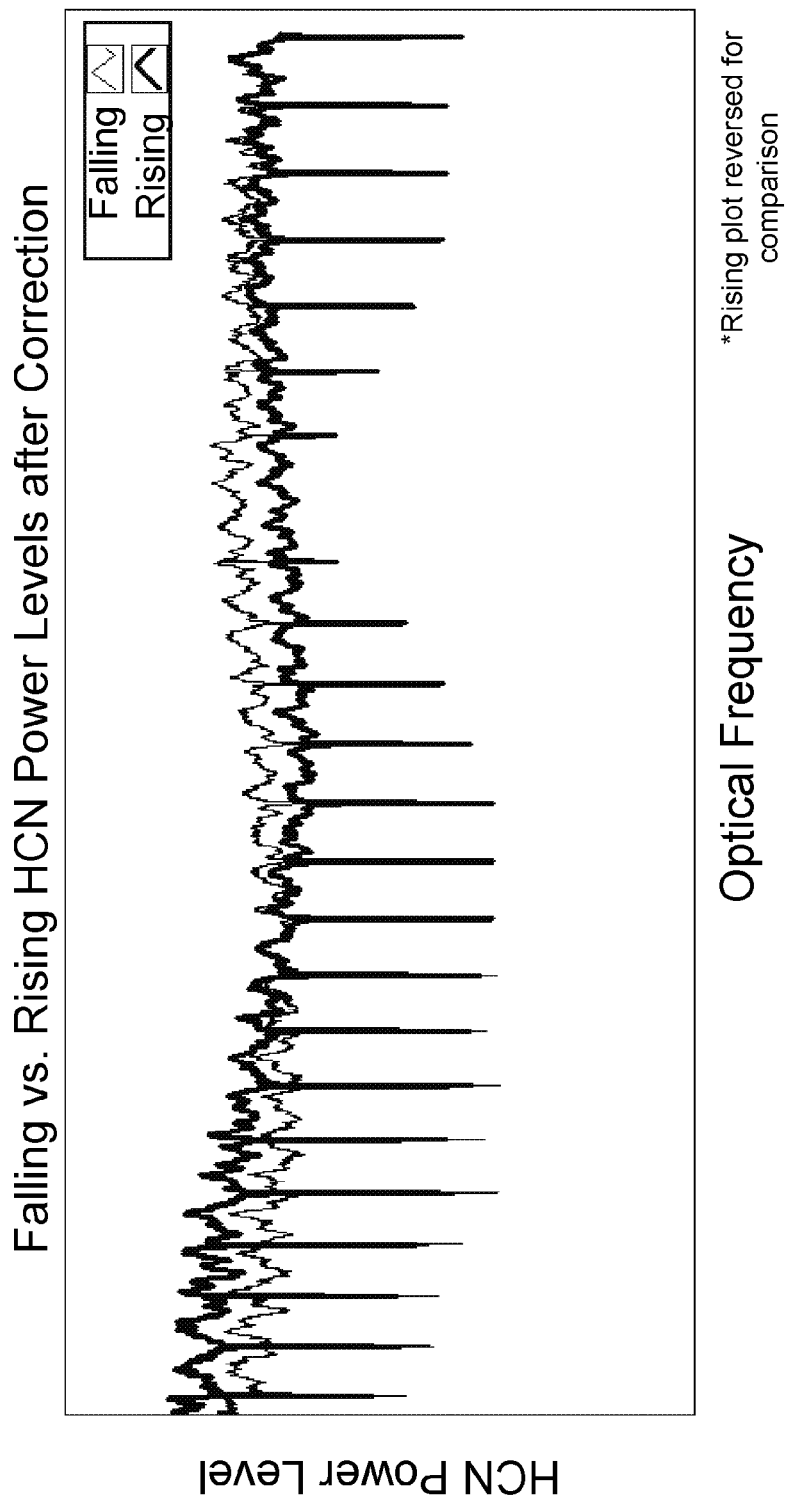
FIG. 7 is a graph showing example falling v. rising hydrogen cyanide (HCN) gas cell power levels in an OFDR system with correction.

FIG. 7 compares the HCN power levels for rising (bold line) and falling (thin line) sweeps after the adjustment is applied to the amplifier's pump laser power, which reduces the average power difference between the rising and falling laser sweeps to less than 0.02 dB.

In addition to adjusting pump laser power to compensate for sweep direction dependent gain, the pump laser power can be adjusted to include more than 2 set points during the course of a laser's sweep cycle to further flatten the power to the DUT.

Figure 8:
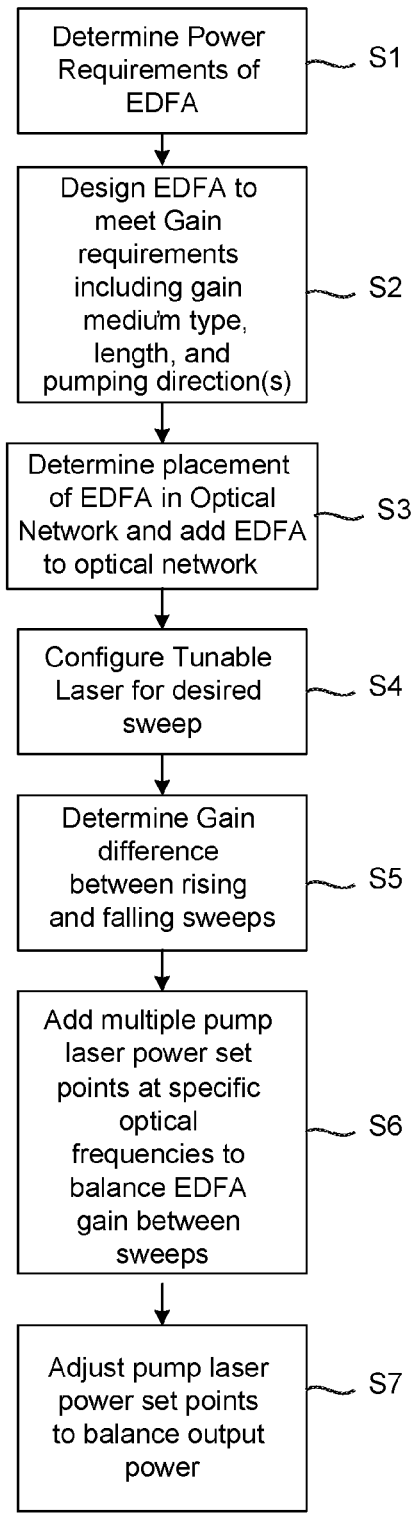
FIG. 8 is a flowchart diagram illustrating example procedures for implementing an EDFA in an OFDR measurement system and for adjusting pump laser gain to balance the laser power output for rising and falling laser sweeps.

FIG. 8 is a flowchart diagram illustrating example procedures for implementing an EDFA in an OFDR measurement system and for adjusting pump laser gain to balance the laser power output for rising and falling laser sweeps. Power requirements of the EFDA are determined (step S1), and the EDFA is configured to meet gain requirements including gain medium type, length, and pumping directions (step S2). Placement of the EDFA in the optical network is determined, and the EDFA is added to the optical network (step S3). The tunable laser is configured for a desired sweep behavior (step S4). A gain difference is determined between rising and falling laser sweeps (step S5). Pump laser power set points are added at specific optical frequencies to balance EDFA gain between rising and falling laser sweeps (step S6). The pump laser power set points are adjusted in order to balances the EDFA output power (step S7).

Modulating Laser Output With a Known Signal

In a fiber optic sensing system, measurement of delay is important. One delay measured is the delay change between the cores of the multi-core fiber sensor. This delay change can be measured in terms of the phase shift or phase difference from a reference phase for each core. In an OFDR system, there are many delay paths that an optical signal and the corresponding electrical signal experience before being detected by the OFDR detection and acquisition system. One example delay, among many others, is that associated with the reference path of the measurement interferometer to the photodiode through the detection and acquisition system.

Example embodiments monitor changes in the delay of these paths and provide a measurement that can be used to signal erroneous data and to correct for dynamic phase shifts in the reference path of the optical network. More specifically, by injecting a known signal, e.g., a ripple signal with a known frequency, into the laser, the phase of each delay path at that frequency can be computed. In one example implementation, that computation is done without performing a fast Fourier transform (FFT). Performing this measurement over a set of frequencies/wavelengths produces the phase response of each detection channel in the system.

In addition to adjusting the pump laser of an amplifier during the laser turnarounds, example embodiments perform in-system testing during laser turnarounds. In these example embodiments, the tunable laser diode output in an optical (e.g., OFDR) measurement system is modulated to detect changes in optical and electrical delays within the system. The modulation in the examples below includes injecting a known signal, e.g., a ripple with a known frequency, into the tunable laser diode output. Other known signals or modulation techniques may be used.

Figure 9:
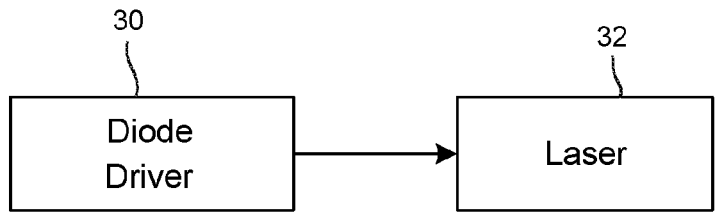
FIG. 9 is a diagram of a laser drive system.

Because constant laser power is desirable in an OFDR system, control systems and processing algorithms may be designed specifically to reduce or compensate for any ripple present in the tunable laser output. A typical diode driver circuit that drives and maintains constant power output is illustrated in FIG. 9. The diode driver 30 driving the laser diode 32 may be a current source controlled via an analog and/or digital closed loop control scheme. The driver 30 may also be a look up table of values stored in memory that are retrieved by a processor to adjust the current to predetermined levels at specific locations in the laser's sweep cycle in an open loop fashion. This table could also be updated periodically by an internal and/or external controlling process to maintain laser power levels over time.

Unwanted modulations in the laser power can introduce errors in the OFDR measurement in the form of broad band noise or as reflective events that are not actually present in the sensor or DUT. Contrary to conventional thinking, example embodiments purposely inject ripple into the laser diode output signal with steps taken so as not to degrade the OFDR measurement.

Figure 10:
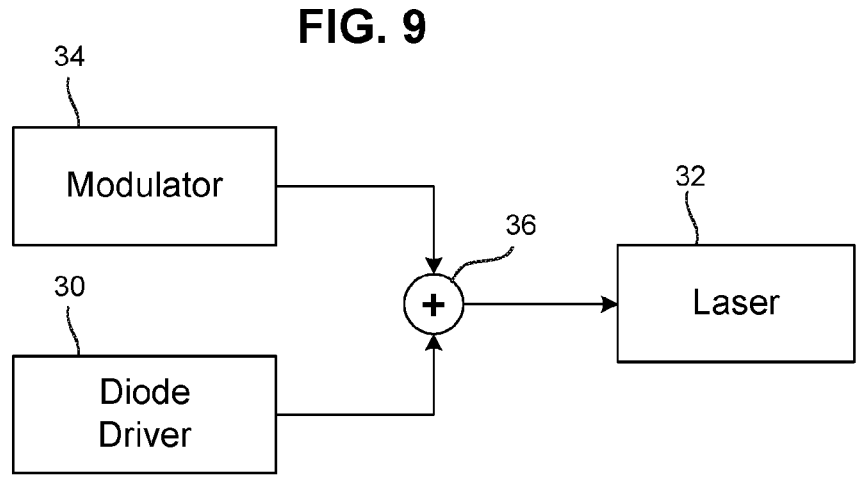
FIG. 10 is a diagram that adds modulation to the laser drive system in FIG. 12.

FIG. 10 depicts the laser diode driver 30 along with a modulator 34 whose outputs are combined by combiner 36 and provided to the laser diode 32. The modulator 34 can be implemented in various ways and combined with the diode driver 30 signal in various ways, such as for example wiring the signals together or adding them with an op-amp configured as an adder.

Figure 11:
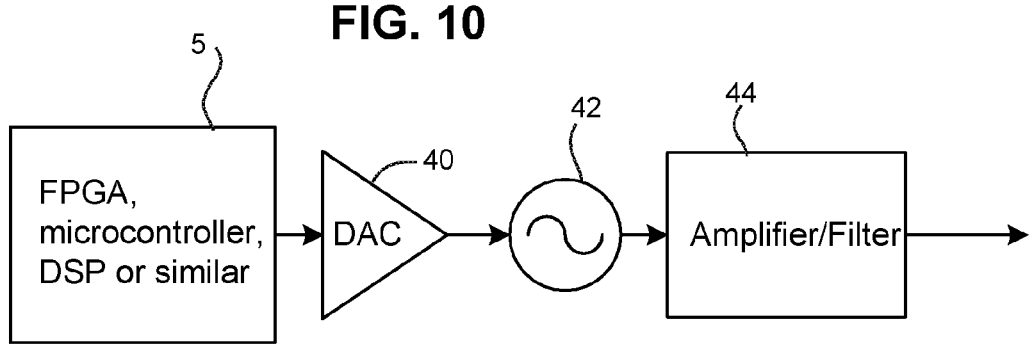
FIG. 11 shows a first example laser modulator approach.

One example of modulator 34 is shown below in FIG. 11 and includes a processor-controlled digital-to-analog converter (DAC) 40, voltage-controlled oscillator (VCO) 42, and an active filter 44 providing signal gain control and low pass filtering. In this example embodiment, the processor 5 selects the VCO 42 output signal frequency by setting the DAC 40 output voltage to a desired value. The VCO 42 output signal may then be used as the modulator by adding this signal to the laser diode drive signal. Additional filtering/amplification 44 may be applied depending on the desired signal characteristics such as amplitude and noise levels. Example processors 5 include a field programmable gate array (FPGA), a microcontroller, a digital signal processor, or other processors. One disadvantage of this modulation approach is that to measure the phase difference between the modulated signal and detected optical signal, an extra data acquisition channel is required to measure the frequency of the VCO output.

Figure 12:
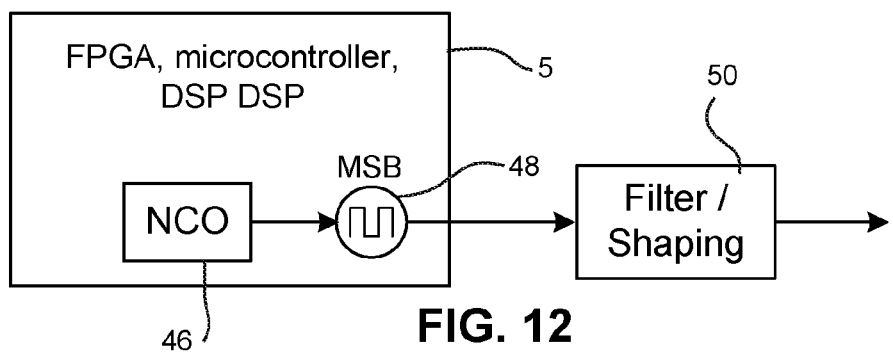
FIG. 12 shows a second example laser modulator.

Another example embodiment of modulator 34 is shown in FIG. 12 and includes processor 5 having or controlling a numerically-controlled oscillator (NCO) 46. The NCO 46 produces a digital output that represents a sine wave at a desired frequency. From this digital output, a clock signal is generated, corresponding to the most significant bit (MSB) 48 of the NCO output. The digital clock signal, output from the processor 5, is low pass filtered by filter/shaper 50 to band limit the content of the digital clock signal. One example filter/shaper 50 is an RC Filter. In this example embodiment, the filtered clock signal is the modulation signal added to the laser diode drive signal to inject ripple to the laser output. This technology requires only minimal external components and has the advantage that the ripple signal (clock) is sourced directly from the processor 5. As a result, the processor 5 knows the frequency of the ripple signal so there is no extra measurement required to determine the frequency of the modulated signal. These features are advantageous when performing high resolution phase difference measurements in the OFDR system.

Driving the laser diode with the addition of this type of modulator produces laser light that carries a known frequency ripple signal component through all paths of the optics and electronic detection circuitry, e.g., a known amplitude modulation. Measuring the light that has traversed the optical network's reference paths, the amplitude modulated signal at each measurement channel in the OFDR system is detected in the data acquisition electronics 4. The phase difference of ripple signal detected on each channel (each channel corresponds to a core in the multi-core fiber sensor) from the originally injected ripple at the modulated frequency is measured, and this phase difference is a measurement of optical and electrical delay differences between channels.

Figure 13:
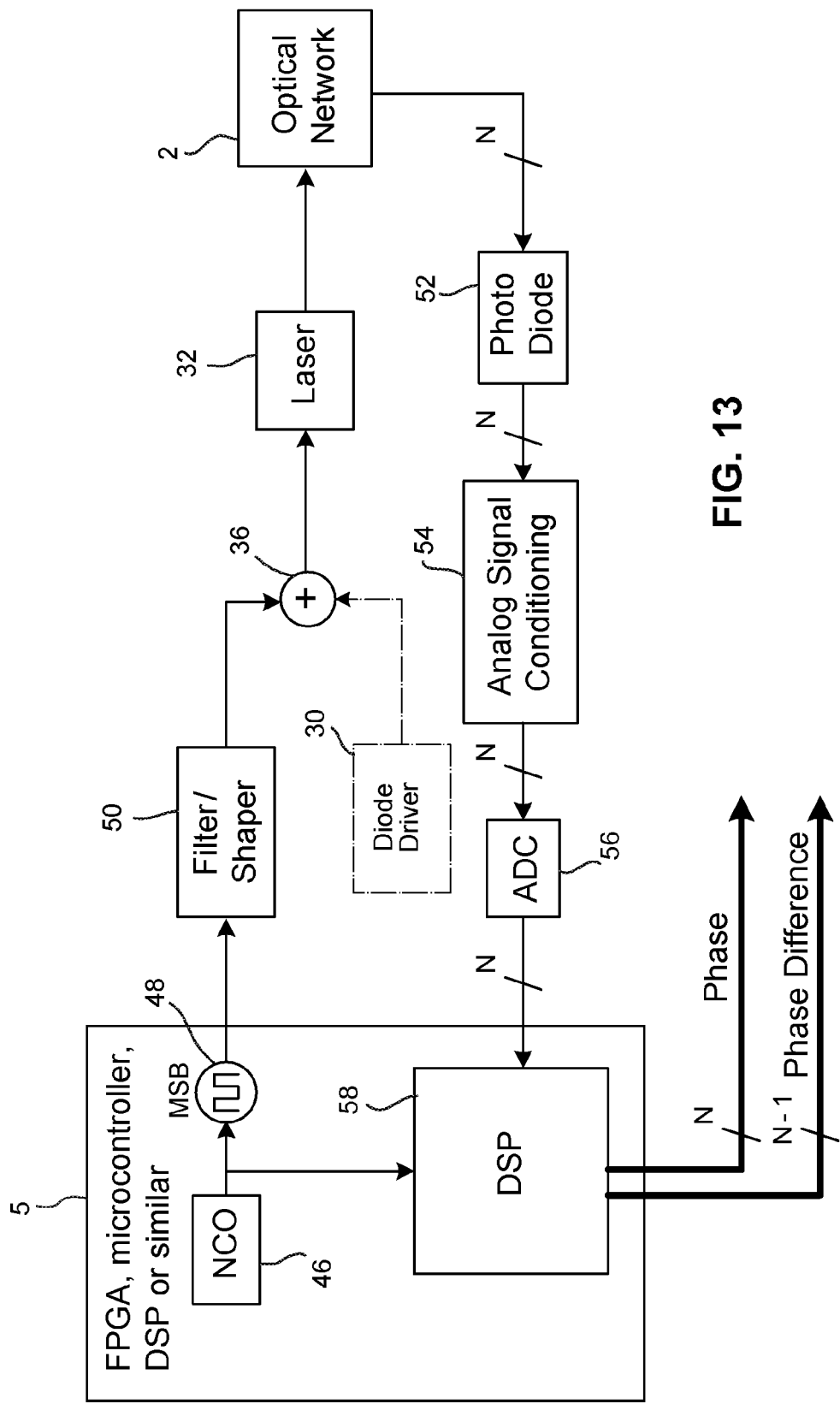
FIG. 13 is an apparatus for modulation and measurement in accordance with example embodiments.

An example modulation and measurement system is shown in FIG. 13. As an example, suppose the NCO 46 is set to 12.5 MHz with the MSB 48 being used as the clock signal sent to filter/shaper 50 and combined at 36 with the laser output from the diode driver 30. The modulated driver output then drives the tunable laser 32 used to sweep the optical network 2. The optical network response for N channels is detected by photodiodes 52, and the corresponding N electrical signals are conditioned 54 and converted to N digital signals corresponding to N core ODFR measurement channels by ADC 56. The N channel digital signals are processed by the DSP or processor 58 to produce N different channel phases and to calculate and output N−1 phase difference signals between each determined channel phase with respect to one common channel's phase. The common channel may be selected as one of the OFDR channels.

Data from the N channels is acquired by the processor 5 in the time domain, meaning that each point is sampled at particular frequency, e.g., at 200 MHz. To determine the phase of the injected ripple for each channel, a fast Fourier transform (FFT) is performed on the measurement data from each channel without having to perform data linearization. This is unlike processing for a sensor/DUT OFDR measurement where the OFDR measurement data must first be linearized or resampled based on the laser tuning speed during the course of the measurement. Once the FFT is performed on the non-linearized measurement data, a peak is observed in the data at index 12,500 corresponding to a 12.5 MHz modulation signal (in this example). To determine the phase difference between the N channels, the DSP 58 takes the FFT result and computes the phase of the complex point at index 12,500 for each channel to determine the phase of the signal detected at the modulation frequency. Then one common channel (example channel 0) is subtracted from all N channels. These resultant N−1 phase differences from each of N−1 channels with respect to common channel 0 indicates N−1 delay differences between the N cores in the fiber sensor. The N−1 delay differences between the N cores in the fiber can produce a significant error, e.g., in a shape sensing application, if not removed from the OFDR measurement.

By sweeping the NCO 46 over the frequency range of the DUT or sensor, the phase of each OFDR measurement channel at each frequency is computed yielding the phase response of the optical network's reference path and the electronic acquisition and detection circuitry for each core measurement channel as a function of frequency. This phase response is used to correct for the phase differences between each measurement channel. Additionally, monitoring this phase response for changes provides real-time monitoring of the delay paths in an optical network and in the electronics, which may be used to provide feedback to detect measurement errors induced as a result of optical and electrical delay path changes.

The inventors realized that because the phase of only a single point of the FFT is required, the phase can be computed without performing a complete FFT by mixing the data acquired from the N channels to baseband using the same frequency as the modulator, which in this example is the output of the NCO used to source the modulation signal. Once at baseband, the DC term of each channel is the point at which the phase is to be computed and compared to the common channel. The phase is computed by accumulating complex components of the basebanded signal of each channel and computing the phase of the resulting complex value. These operations can be performed for example in a DSP or FPGA.

Figure 14:
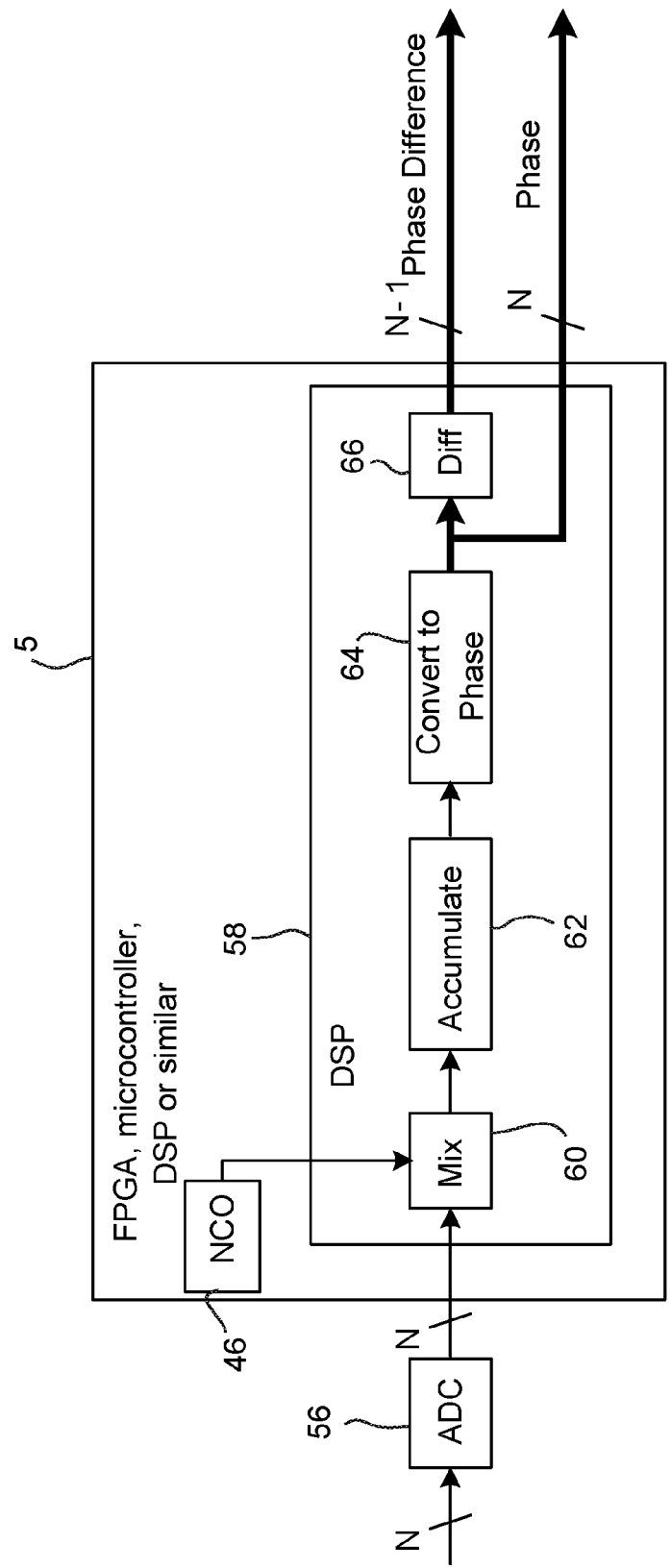
FIG. 14 is an example apparatus for phase computation by mixing with the same signal used to modulate the laser in accordance with example embodiments.

An example of such DSP processing is shown in FIG. 14. The N digital samples from the N core OFDR measurements are mixed in mixer 60 with the output signal from the NCO 46. The mixer 60 multiples each channel by the complex NCO 46 output (sine and cosine). The complex mixed signals are accumulated (summed) at 62 and converted from complex to polar form to determine the phase. These phase values represent the phase difference between the modulated signal and the signals detected for each channel. To obtain the phase difference between the channels, the phase of one common channel is subtracted at 66 from each of the N channels to determine the N−1 phase differences between the channels.

Figure 15:
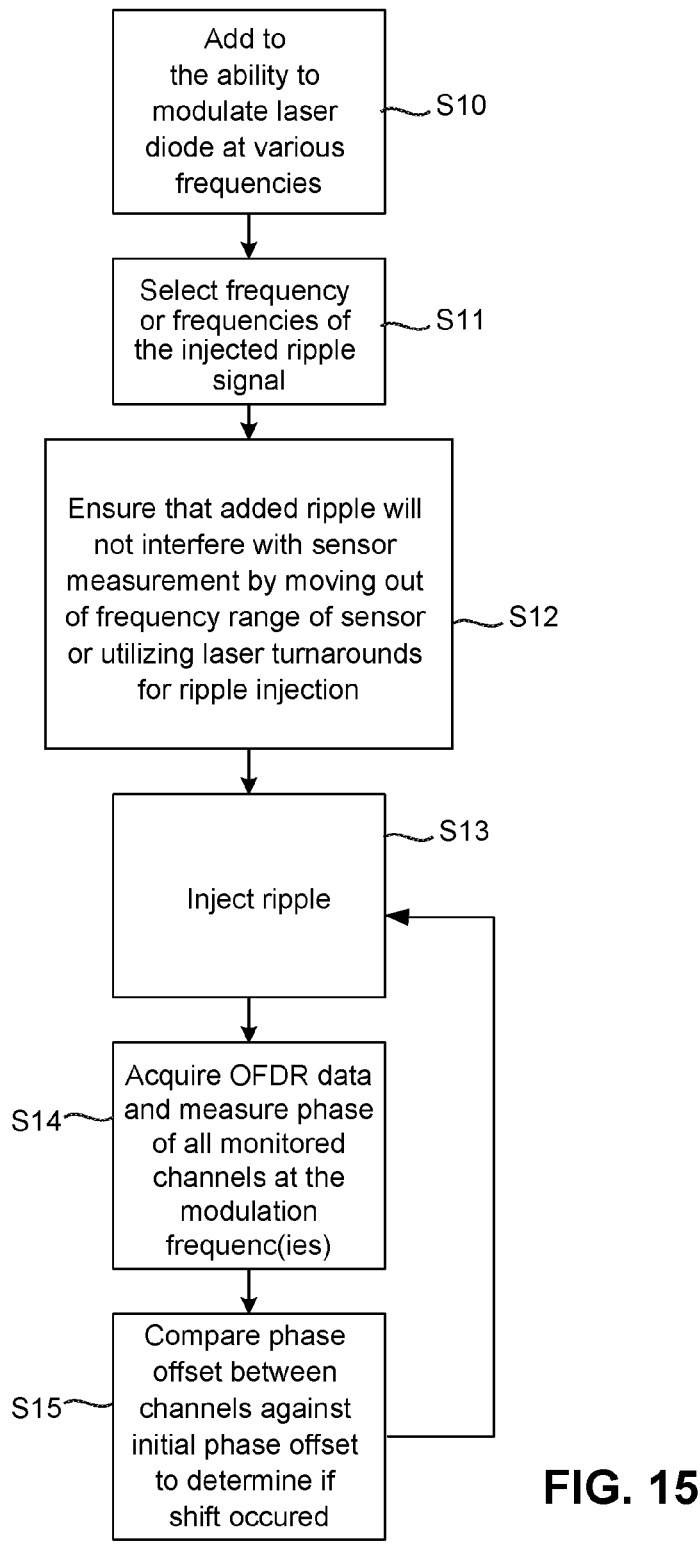
FIG. 15 is a flowchart illustrating example procedures for performing delay monitoring using laser diode ripple injection.

FIG. 15 is a flowchart illustrating example procedures for performing delay monitoring using laser diode ripple injection. Electronics are added to the OFDR system to modulate the laser diode at one or more frequencies (step S10), and the frequency(frequencies) of the injected ripple is(are) selected (step S11). The added ripple is located in a frequency or frequencies that are out of the sensor's measurement frequency range to ensure that the added ripple does not interfere with sensor measurements (step S12). The ripple signal is injected into the laser diode output (step S13), and OFDR data and phase measurements are made for all monitored channels at the modulation frequency (frequencies) (step S14). The DSP computes the phase difference of the modulation signal between N channels to determine if a change in optical or electrical delay occurred (step S15).

Using Laser Sweep Edges and Turnarounds to Perform Additional Measurements

While the modulated laser light may interfere with the sensor measurement, it is also possible that the interference is caused by reflected events in the fiber sensor. The inventors realized that the effects of linearization on this modulation signal needed to be understood and accounted for. Linearization refers to the process of resampling the acquired measurement data based on the instantaneous tuning rate of the laser. The result of the linearization process is measurement data which is equally-spaced in optical frequency rather than in time.

Figure 16A:
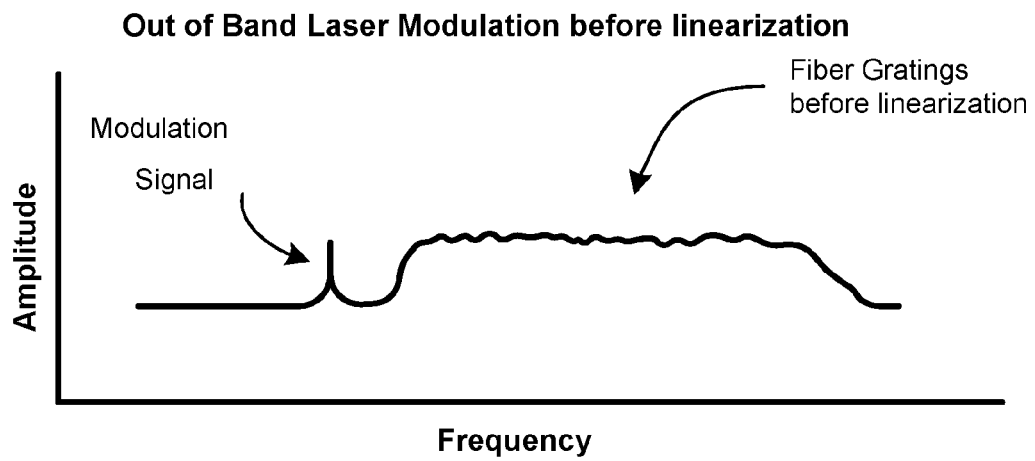
FIGS. 16A and 16B are graphs showing out of band laser modulation before and after linearization.
Figure 16B:
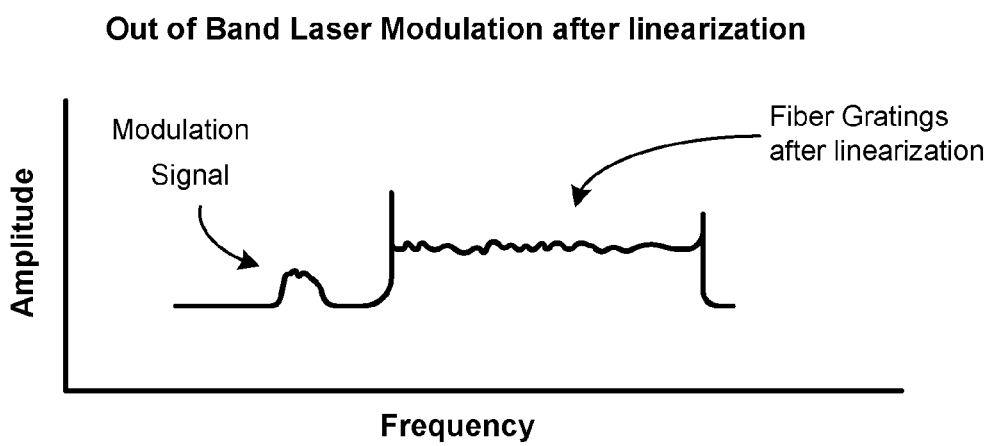

FIG. 16A shows how an out-of-band modulation without linearization produces a strong observable peak relative to sensor gratings at the frequency of the modulation source. Linearization is not required to measure the modulation signal because this is just the measurement of an amplitude modulated signal in the time domain measurement and not an OFDR measurement. FIG. 16B illustrates the effect of linearization on such a signal. The resampling that is done as part of the linearization process spreads this signal over a wide range of frequencies based on the tuning rate fluctuations of the swept laser.

Modulating the laser power can interfere with the measurement being performed if the modulation frequency and timing of this signal are not considered. For instance if the modulation signal is too close to sensor gratings included along the fiber sensor, it is possible that when the data is linearized, the modulation signal may interfere with the OFDR grating measurement. In an OFDR-based measurement, modulation of the laser diode can be done at the same time as the OFDR measurement provided that the modulation frequency is outside the frequencies expected of the OFDR measurement. However, care must be taken to ensure that fiber sensor connector and termination reflections are minimized. Otherwise, these reflections can create interference signals when coupled with the modulation signal that produce additional unwanted frequencies of modulation within the fiber sensor that can introduce errors in the OFDR measurement.

If a grating measurement is being performed, a higher grating strength can corrupt the measurement of the modulation signal. The inventors recognized several options to address this problem. One option is to limit the modulation frequencies to frequencies outside that of the grating fiber. A disadvantage of this option is possible measurement error since the frequencies where the sensor actually resides are not being measured. This disadvantage may be removed by moving the modulation from frequencies within the measurement region to the turnaround frequencies. Depending on the response of the amplifier and duration of the turnarounds, the amplifier can be turned off entirely or the amplifier gain reduced. Reducing the amplifier gain sufficiently can reduce the grating reflections to below the noise floor, thereby allowing the modulation measurement to be performed without any measureable interference from the gratings.

Figure 17A:
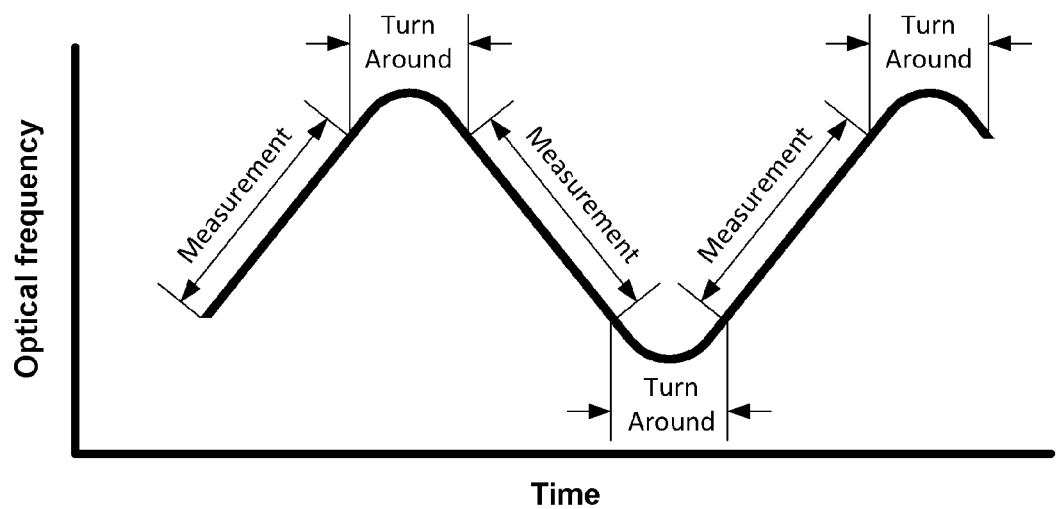
FIGS. 17A and 17B are graphs showing laser modulation at laser tuning turnarounds.
Figure 17B:
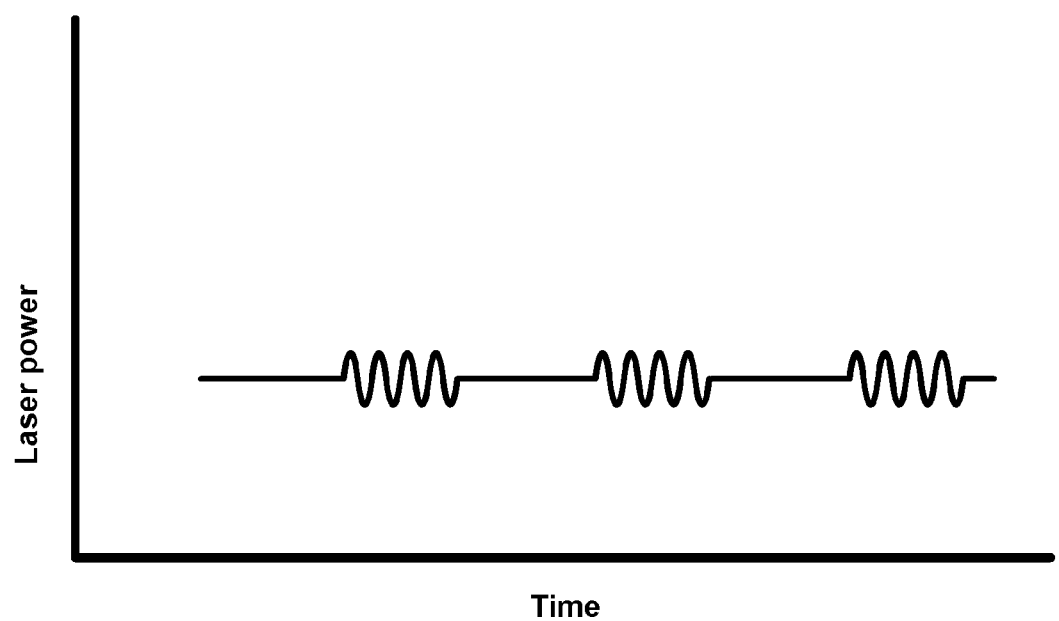

To avoid measurement interference, example embodiments perform laser diode modulation based measurements during turnaround points of the laser sweep as illustrated in FIGS. 17A and 17B. The example of FIG. 17B shows the modulation occurring only during the turnaround times, although there may be embodiments where some modulation may occur outside the turnaround times or continuously.

Figure 18:
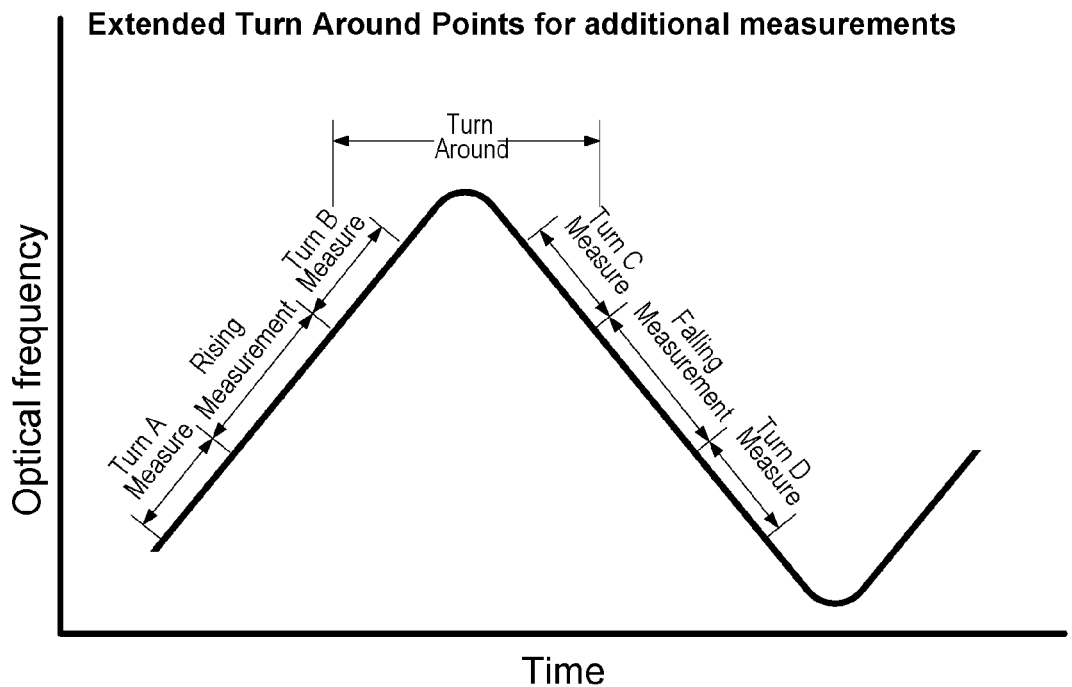
FIG. 18 is a graph showing extended turnaround points for making additional measurements in accordance with example embodiments.

The inventors realized that these laser sweep turnaround points provide an opportunity to make further corrections, perform checks, and make other dynamic adjustments. This continuous sweeping action of the laser can be further broken down into the different sections illustrated in the graph in FIG. 18.

One example embodiment uses laser sweep turnarounds to perform additional OFDR measurement data acquisitions that are beyond the fiber sensor wavelength. For example, in the case of a fiber sensor that includes Bragg gratings, grating reflections can be designed or the fiber restricted to reflect light within a known wavelength range. The continuous laser sweep is configured so that the turnarounds are beyond the wavelength range in which those OFDR measurements are acquired from the fiber sensor, i.e., beyond the fast rising and fast falling portions of the laser sweep shown in FIG. 19. This allows OFDR measurements to be made over additional wavelength ranges in the turnaround parts of the laser sweep. Extending the turnarounds to include additional ranges also allows for Rayleigh scatter-based OFDR measurements to be performed (which are different form the Bragg grating-based OFDR measurements).

Figure 19:
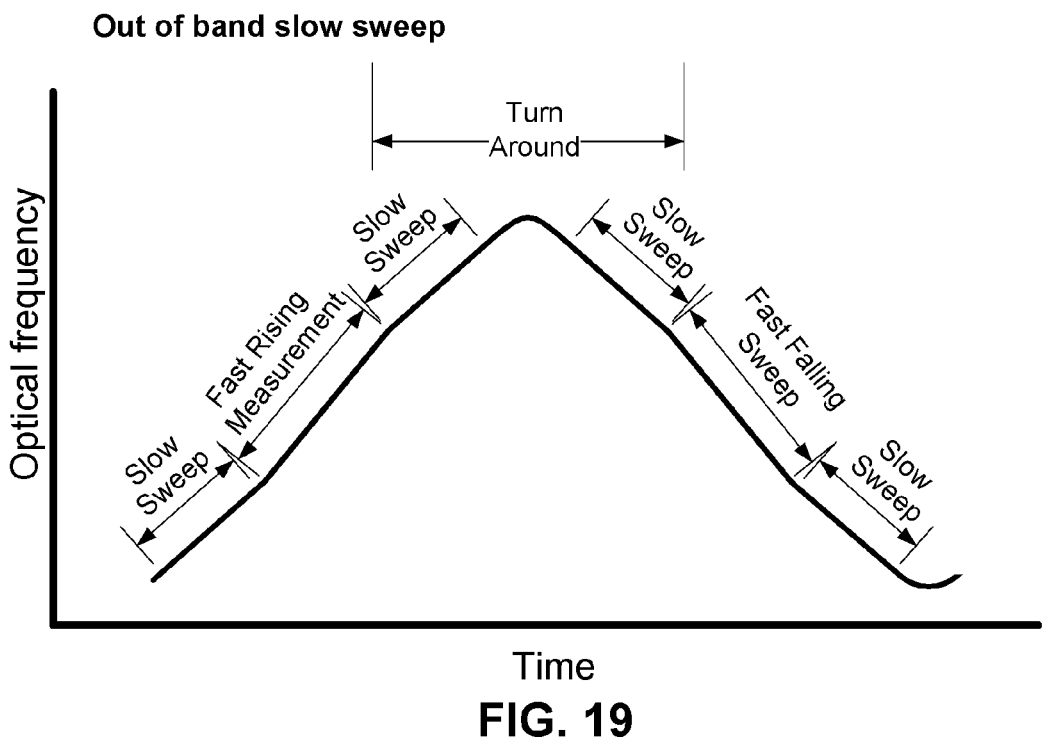
FIG. 19 is a graph showing example out of band slow laser sweep portions in addition to typical faster speed sweep portions in accordance with example embodiments.

In addition to acquiring data beyond the frequency range of the gratings, or the primary OFDR measurement, out of band OFDR measurements can be taken at slower sweep rate portions of the laser sweep as illustrated in FIG. 19. By slowing the laser sweep rate down in these portions, out-of-band OFDR measurements can be performed over a longer distance along the fiber sensor.

Figure 20A:
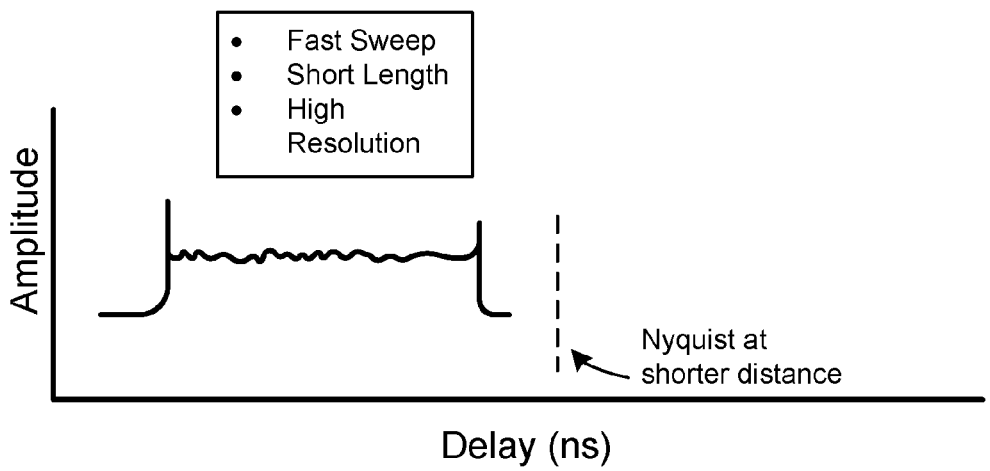
FIGS. 20A and 20B are graphs showing fast sweep portions and slow out of band sweep portions.
Figure 20B:
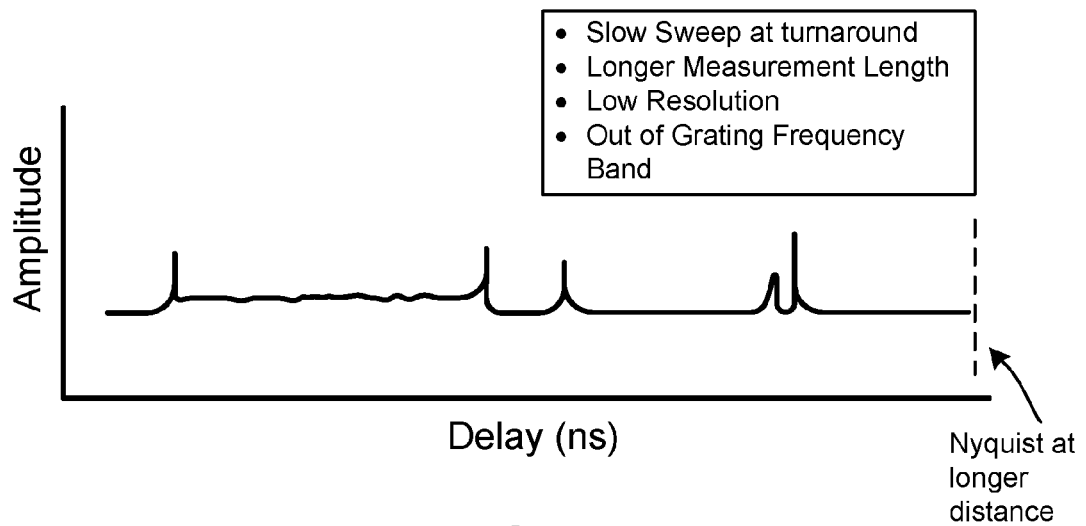

Example extension of the OFDR measurement range is illustrated in FIGS. 20A and 20B. FIG. 20A depicts an example fiber Bragg grating amplitude measurement at a faster sweep rate and shorter delay or length along the fiber sensor. Utilizing a wider laser sweep or scan range provides higher resolution, but the faster sweep rate results in a shorter measurement range as the Nyquist rate (i.e., the minimum rate at which a signal can be sampled without introducing errors, which is twice the highest frequency present in the signal) is located at a shorter delay/distance from 0 ns. FIG. 20B shows a graph of a slower, lower resolution sweep. As a result of the slower sweep rate and utilizing optical frequencies that are beyond the range of the gratings, reflective events beyond those of the sensing fiber can be measured.

Figure 21:
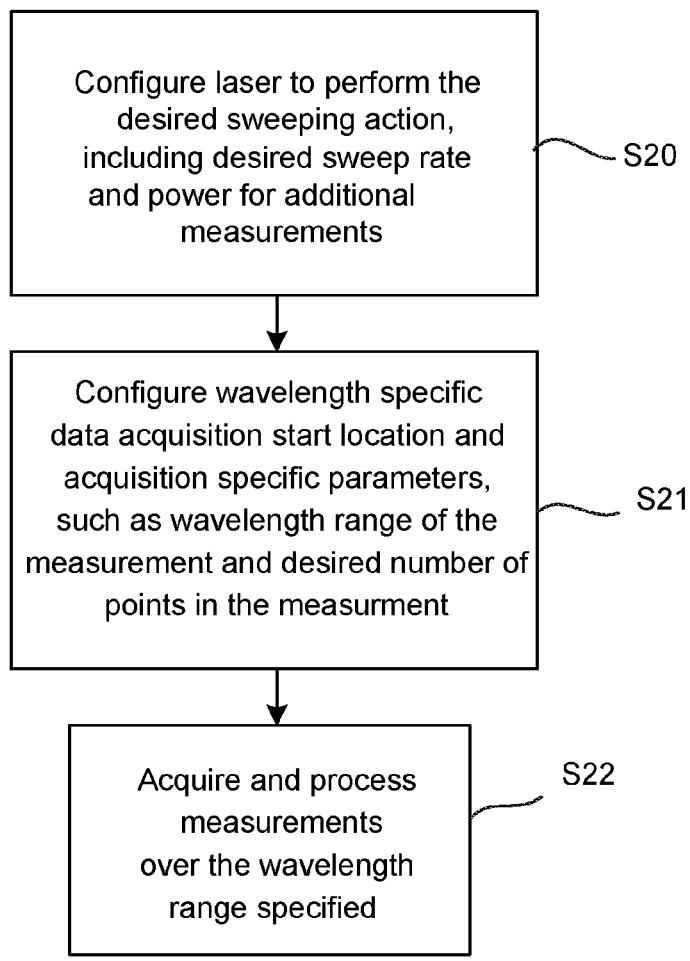
FIG. 21 is a flowchart illustrating example procedures for utilizing laser sweep edges and turnarounds to perform additional measurements.

FIG. 21 is a flowchart illustrating example procedures for utilizing laser sweep edges and turnarounds to perform additional measurements. The laser is configured to perform a desired sweeping behavior including for example desired sweep rate and power for making additional measurements (step S20). Wavelength specific data acquisition start location and acquisition specific parameters such as the wavelength range of the measurement and the desired number of points in the measurement are determined (step S21). The data acquisition circuitry acquires and processes ODFR measurements over the wavelength range specified (step S22).

Figure 22:
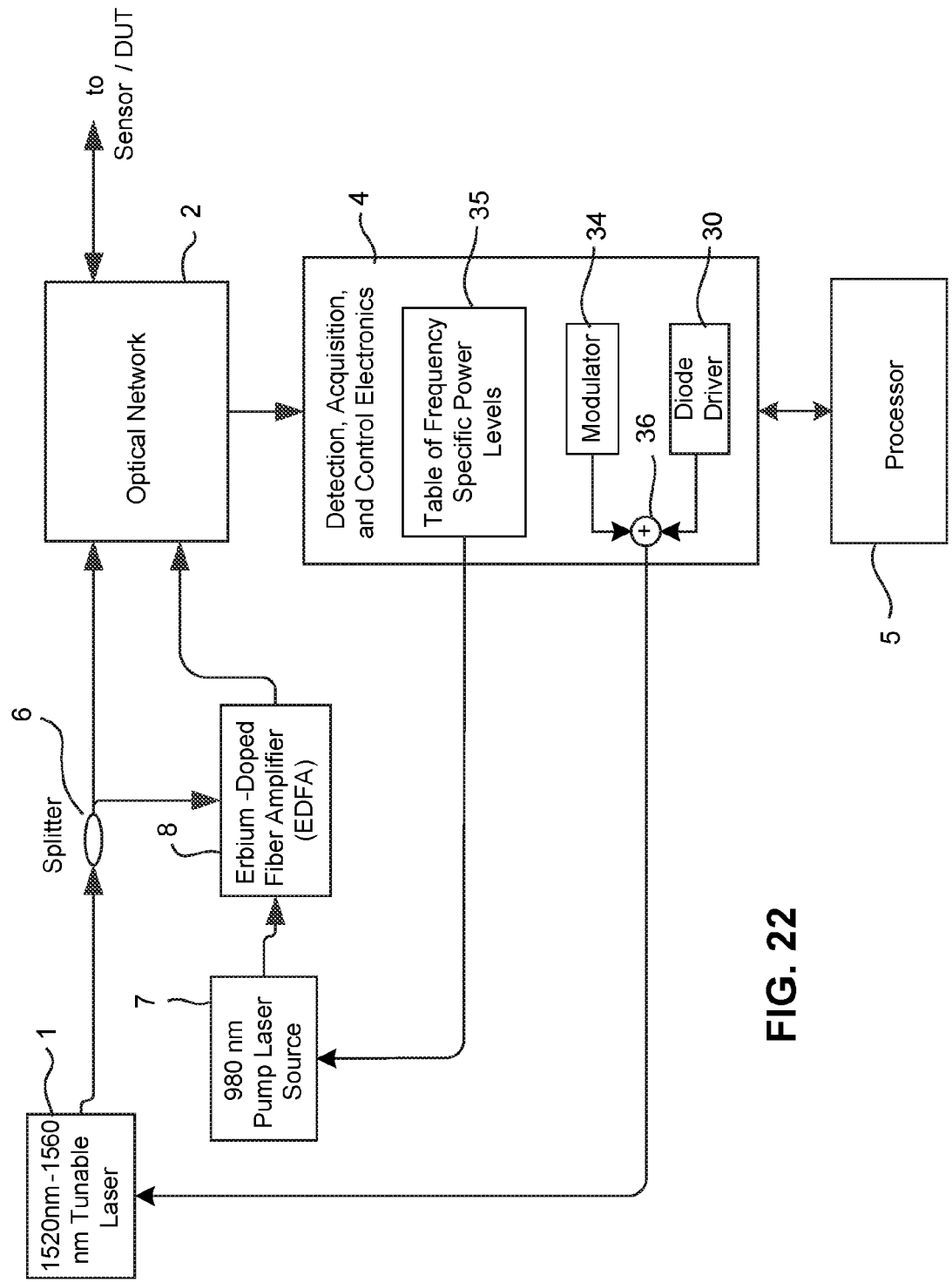
FIG. 22 shows an example OFDR measurement system in accordance with example embodiments.

FIG. 22 illustrates an example of an OFDR system that includes multiple features from above such as a laser modulator such as one of the examples described above and frequency-specific power levels to adjust the pump laser's power level. In accordance with example embodiments, a table of frequency-specific power levels stored in memory 35 is used by processing control circuitry in the detection, acquisition, and control electronics 4 to control the pump laser power level. The modulator 34 output combines with the output of the diode driver circuit 30 to control the output power of the tunable laser 1, e.g., for the reasons described in an earlier section, and/or to inject the modulated signal into the laser output, e.g., for the reasons just described in this section.

Figure 23:
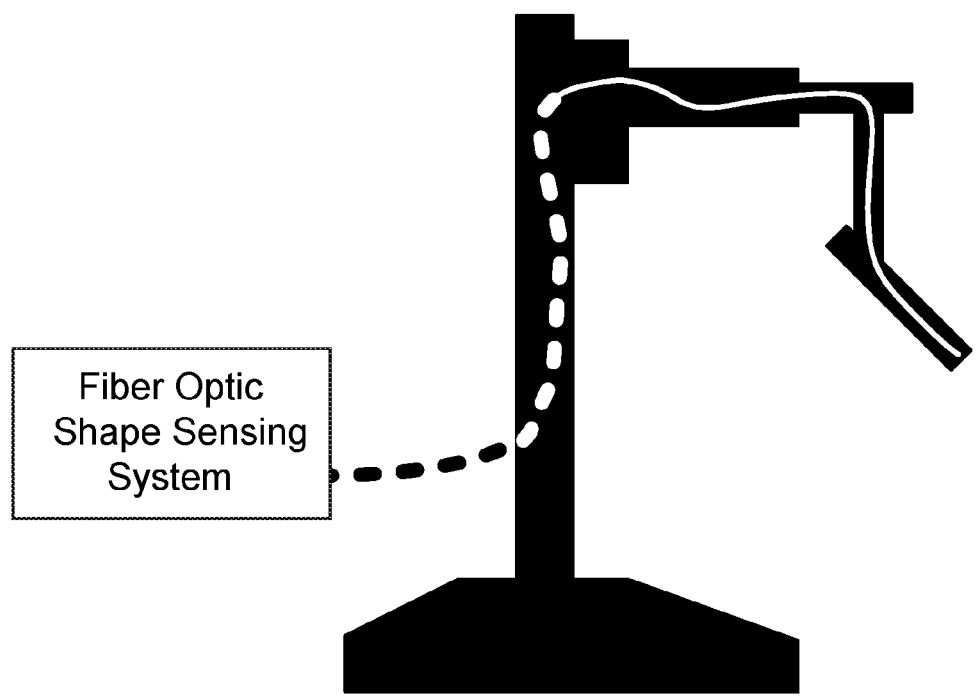
FIG. 23 shows an example use of a fiber optic shape sensing system to a robotic surgical arm.

The technology described above has wide and diverse applications to improve the accuracy and reliability of optical network measurements. One non-limiting example application for shape sensing fiber coupled to an OFDR measurement instrument that requires a high degree of confidence in terms of the accuracy and reliability of the shape sensing output is robotic arms used in surgical or other environments. FIG. 23 shows an example use of a fiber optic shape sensing system for a robotic surgical arm in which one or more of the various technical features and/or embodiments described above may be used.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC § 112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. An Optical Frequency Domain Reflectometry (OFDR) interrogation system for measuring an optical fiber sensor including multiple optical cores, the system comprising:

a tunable laser configured to perform a wavelength sweep including: a rising sweep, a falling sweep, and a turnaround portion transitioning between the rising and falling sweeps, wherein in the rising sweep a wavelength of laser light output by the tunable laser increases from a smallest wavelength to a largest wavelength in a first range of wavelengths, wherein in the falling sweep the wavelength of the laser light decreases from the largest wavelength to the smallest wavelength, and wherein in the turnaround portion the wavelength of the laser light comprises wavelengths in a second range of wavelengths outside the first range of wavelengths;

an optical interferometric network and associated detection circuitry to provide the laser light to the optical fiber sensor and to measure reflected light from each of the multiple optical cores of the optical fiber sensor, the measured reflected light corresponding to sensor measurement data; and data processing circuitry to process the sensor measurement data acquired during the rising and falling sweeps and to cause the OFDR interrogation system to perform an additional operation during the turnaround portion.

2. The OFDR interrogation system of claim 1, wherein the additional operation comprises making an additional measurement at one or more wavelengths in the second range of wavelengths.

3. The OFDR interrogation system of claim 2, wherein a sweep rate of the tunable laser in at least a portion of the second range of wavelengths is slower than a sweep rate of the tunable laser in the first range of wavelengths.

4. The OFDR interrogation system of claim 2, wherein the additional measurement includes a scatter-based OFDR measurement for the optical fiber sensor.

5. The OFDR interrogation system of claim 4, wherein the optical fiber sensor includes fiber Bragg gratings that provide reflections within the first range of wavelengths, and wherein the sensor measurement data comprises measurement data of the reflections.

6. The OFDR interrogation system of claim 1, wherein the additional operation comprises balancing a power level of the laser light in the rising sweep with a power level of the laser light in the falling sweep.

7. The OFDR interrogation system of claim 6, further comprising an optical amplifier to amplify the laser light, wherein the data processing circuitry is configured to control a gain of the optical amplifier to balance the power level of the laser light in the rising sweep with the power level of the laser light in the falling sweep.

8. The OFDR interrogation system of claim 7, further comprising a pump laser to provide light to the optical amplifier, wherein the data processing circuitry controls the gain of the optical amplifier by controlling a laser power of the pump laser.

9. The OFDR interrogation system of claim 1, wherein the additional operation includes performing an in-system check or adjustment.

10. The OFDR interrogation system of claim 9, further comprising a modulator configured to modulate the laser light output by the tunable laser, wherein the in-system check or adjustment comprises:
modulating the laser light in accordance with a known signal to detect changes in at least one delay within the OFDR interrogation system, wherein the at least one delay comprises an optical delay or an electrical delay.

11. The OFDR interrogation system of claim 10, wherein the known signal is a ripple signal of a known frequency, and wherein detecting changes in the at least one delay comprises detecting phase differences of the ripple signal between multiple OFDR channels associated with the multiple optical cores.

12. A method of using an optical frequency domain reflectometry (OFDR) interrogation system to measure an optical fiber sensor including multiple optical cores, the method comprising:
sweeping a wavelength of laser light output by a tunable laser to perform a wavelength sweep, the wavelength sweep including a rising sweep, a falling sweep, and a turnaround portion transitioning between the rising and falling sweeps, wherein in the rising sweep a wavelength of laser light output by the tunable laser increases from a smallest wavelength to a largest wavelength in a first range of wavelengths, wherein in the falling sweep the wavelength of laser light decreases from the largest wavelength to the smallest wavelength, and wherein in the turnaround portion the wavelength of the laser light comprises wavelengths in a second range of wavelengths outside of the first range of wavelengths;
providing the laser light to the optical fiber sensor and measuring reflected light from each of the multiple optical cores of the optical fiber sensor, the reflected corresponding to sensor measurement data;
processing the sensor measurement data acquired during the rising and falling sweeps; and
performing an additional operation during the turnaround portion.

13. The method of claim 12, wherein a sweep rate in at least a portion of the second range of wavelengths is slower than a sweep rate in the first range of wavelengths.

14. The method of claim 12, wherein performing the additional operation comprises:
performing an additional measurement at one or more laser wavelengths in the second range of wavelengths.

15. The method of claim 14, wherein the additional measurements comprise a scatter-based OFDR measurement for the optical fiber sensor.

16. The method of claim 14, wherein performing an additional operation during the turnaround portion comprises:
balancing a power level of the laser light in the rising sweep with a power level of the laser light in the falling sweep.

17. The method of claim 14, wherein performing an additional operation during the turnaround portion comprises:
performing an in-system check or adjustment.

18. The method of claim 17, wherein performing the in-system check or adjustment comprises modulating the laser light in accordance with a known signal to detect changes in at least one delay within the OFDR interrogation system, wherein the at least one delay comprises an optical delay or an electrical delay.

19. A non-transitory machine-readable medium comprising a plurality of machine-readable instructions which when executed by one or more processors associated with an optical frequency domain reflectometry (OFDR) interrogation system are adapted to cause the one or more processors to perform a method of measuring an optical fiber sensor including multiple optical cores, the method comprising:
causing a tunable laser to perform a wavelength sweep, the wavelength sweep including a rising sweep, a falling sweep, and a turnaround portion transitioning between the rising and falling sweeps, wherein in the rising sweep a wavelength of laser light output by the tunable laser increases from a smallest wavelength to a largest wavelength in a first range of wavelengths, wherein in the falling sweep the wavelength of laser light decreases from the largest wavelength to the smallest wavelength, and wherein in the turnaround portion the wavelength of the laser light comprises wavelengths in a second range of wavelengths outside of the first range of wavelengths;
processing sensor measurement data acquired during the rising and falling sweeps, the sensor measurement data corresponding to light reflected from each of the multiple cores of the optical fiber sensor as the laser light is provided to the optical fiber sensor; and
causing an additional operation to be performed during the turnaround portion.

20. The non-transitory machine-readable medium of claim 19, wherein causing the additional operation to be performed comprises:
processing an additional measurement made at one or more laser wavelengths in the second range of wavelengths; or causing a balancing of a power level of the laser light in the rising sweep with a power level of the laser light in the falling sweep; or causing a performance of an in-system check or adjustment.

\* \* \* \* \*